United States Patent
Yanagawa et al.

(10) Patent No.: US 7,030,953 B2
(45) Date of Patent: Apr. 18, 2006

(54) LIQUID CRYSTAL DISPLAY WITH GATE LINES AND AN EDGE OF THE BLACK MATRIX ELONGATED PARALLEL TO AN INITIAL ORIENTATION DIRECTION

(75) Inventors: Kazuhiko Yanagawa, Mobara (JP); Keiichiro Ashizawa, Mobara (JP); Masahiro Ishii, Mobara (JP); Masayuki Hikiba, Mobara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/659,369

(22) Filed: Sep. 11, 2003

(65) Prior Publication Data

US 2004/0046922 A1    Mar. 11, 2004

Related U.S. Application Data

(63) Continuation of application No. 10/106,954, filed on Mar. 28, 2002, now Pat. No. 6,667,790.

(30) Foreign Application Priority Data

Feb. 5, 1999    (JP)    ................................. 11-029053

(51) Int. Cl.
  *G02F 1/1343*    (2006.01)
(52) U.S. Cl. ........................ 349/141; 349/144; 349/139
(58) Field of Classification Search ................ 349/110, 349/155, 139, 141, 146, 144, 145
See application file for complete search history.

(56) References Cited

U.S. PATENT DOCUMENTS

| | | | |
|---|---|---|---|
| 4,904,056 A |  | 2/1990 | Castleberry |
| 5,576,867 A |  | 11/1996 | Baur et al. |
| 5,598,285 A |  | 1/1997 | Kondo et al. |
| 5,643,471 A | * | 7/1997 | Onishi et al. .................. 216/23 |
| 5,680,187 A | * | 10/1997 | Nagayama et al. ......... 349/110 |
| 5,745,207 A | * | 4/1998 | Asada et al. ................ 349/141 |
| 5,786,876 A |  | 7/1998 | Ota et al. |

(Continued)

FOREIGN PATENT DOCUMENTS

JP    3-59522    3/1991

*Primary Examiner*—Andrew Schechter
*Assistant Examiner*—Mike Qi
(74) *Attorney, Agent, or Firm*—Reed Smith LLP; Stanley P. Fischer, Esq.; Juan Carlos A. Marquez, Esq.

(57) ABSTRACT

The present invention is to provide the multi-domain system IPS (In-Plane Switching mode) liquid crystal display which has high contrast and does not have an improper image display. According to an aspect of the present invention, there is provided a black matrix formed between a pair of substrates and formed over a plurality of drain lines and gate lines, a plurality of spaces arranged under the black matrix, wherein a plurality of liquid crystal molecules lined to a boundary direction of the black matrix in "OFF" state, and having a first group and a second group in "ON" state, wherein a switching angle of the second group is opposite to a switching angle of the first group.

8 Claims, 22 Drawing Sheets

U.S. PATENT DOCUMENTS

| | | |
|---|---|---|
| 5,905,556 A | 5/1999 | Suzuki et al. |
| 5,917,572 A | 6/1999 | Kurauchi et al. |
| 5,946,066 A | 8/1999 | Lee et al. |
| 5,956,111 A | 9/1999 | Ohta et al. |
| 5,978,063 A | 11/1999 | Crawford et al. |
| 6,016,181 A | 1/2000 | Shimada |
| 6,049,369 A | 4/2000 | Yanagawa et al. |
| 6,052,163 A * | 4/2000 | Sung ........................... 349/42 |
| 6,091,473 A | 7/2000 | Hebiguchi |
| 6,097,467 A * | 8/2000 | Fujimaki et al. ............. 349/155 |
| 6,211,937 B1 * | 4/2001 | Miyachi et al. ............. 349/156 |
| 6,281,960 B1 | 8/2001 | Kishimoto et al. |
| 6,320,636 B1 | 11/2001 | Zhang et al. |
| 6,342,937 B1 | 1/2002 | Hiroshi |
| 6,356,335 B1 | 3/2002 | Kim et al. |
| 6,411,360 B1 | 6/2002 | Matsuyama et al. |
| 6,433,852 B1 | 8/2002 | Sonoda et al. |
| 6,445,437 B1 | 9/2002 | Miyazaki et al. |

\* cited by examiner

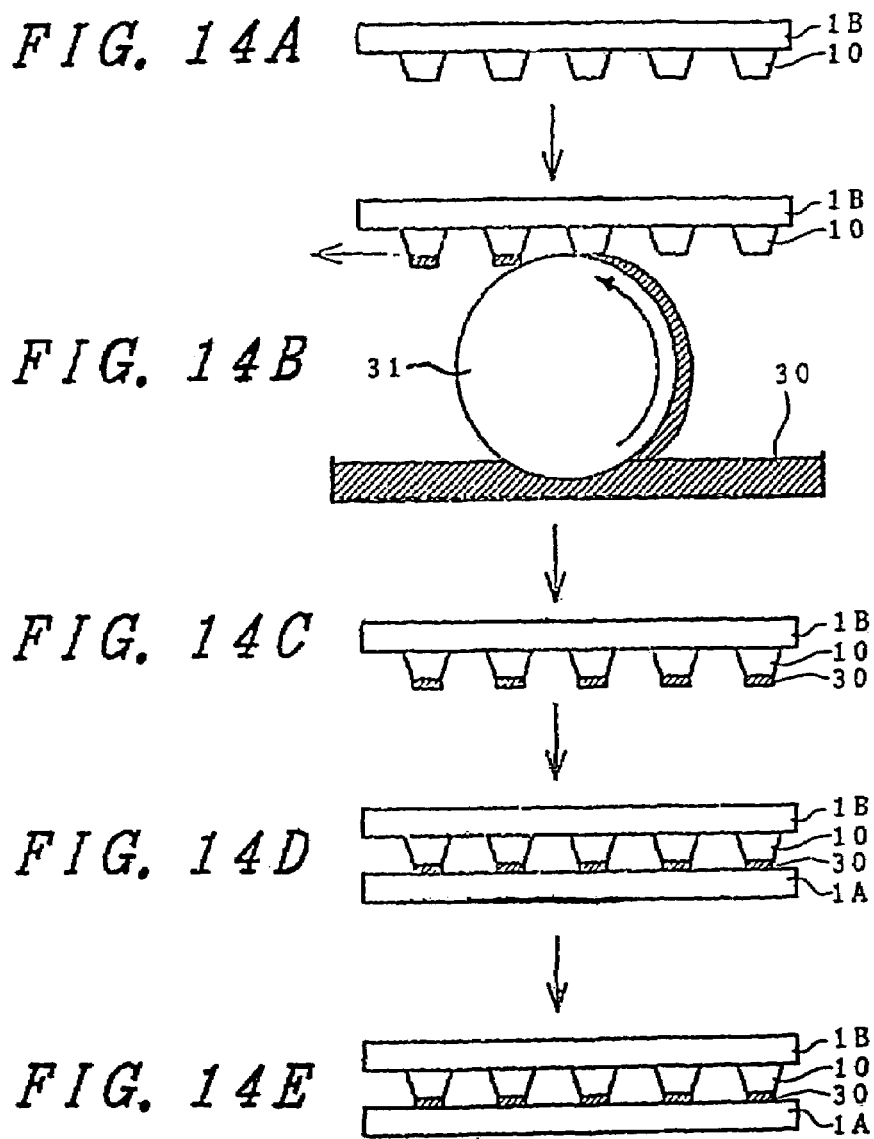

FIG. 19
FIG. 20
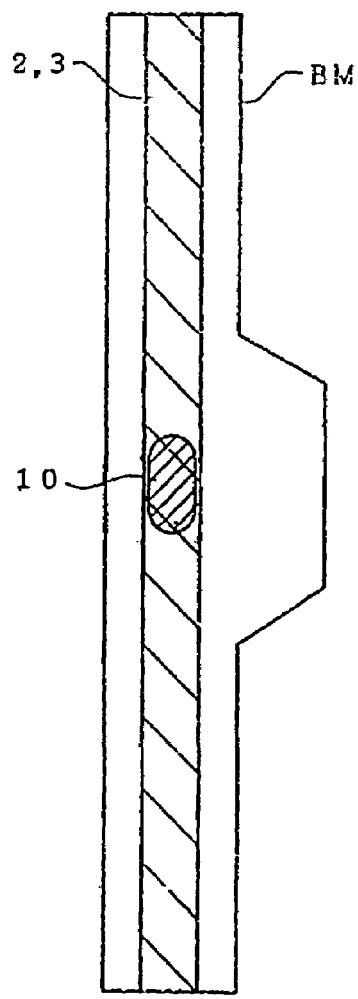
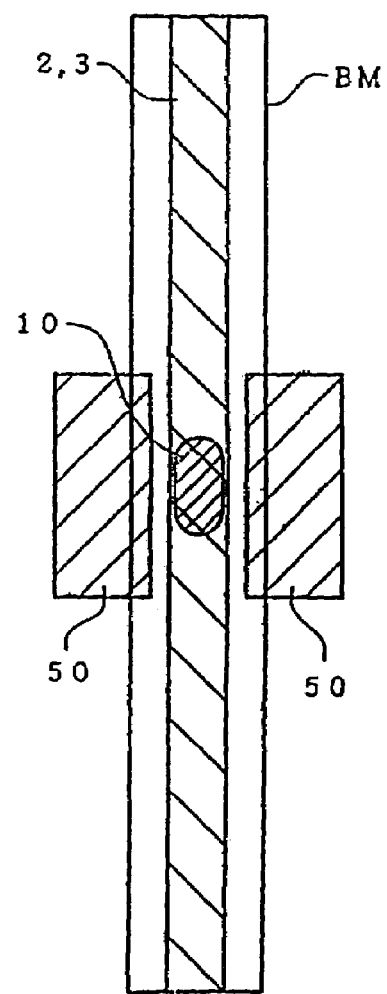

LIQUID CRYSTAL DISPLAY WITH GATE LINES AND AN EDGE OF THE BLACK MATRIX ELONGATED PARALLEL TO AN INITIAL ORIENTATION DIRECTION

This application is a Continuation of nonprovisional application Ser. No. 10/106,954 filed on Mar. 28, 2002 now U.S. Pat. No. 6,667,790. Priority is claimed based on U.S. application Ser. No. 10/106,954 filed on Mar. 28, 2002, which claims the priority of Japanese application 11-029053 filed on Feb. 5, 1999.

BACKGROUND OF THE INVENTION

1. Field of the Invention

The present invention relates to a liquid crystal display device. More specifically, the invention relates to a liquid crystal display device with high contrast characteristics of the multi-domain system using spacers.

2. Description of the Prior Art

Active matrix liquid crystal display devices using active elements as represented by thin-film transistors (TFT) have now been widely used as display terminals of OA equipment since they are light in weight and have picture quality equivalent to that of cathode-ray tubes.

The display system of the liquid crystal display devices can be roughly divided into two. One is a system in which liquid crystals are sandwiched by two substrates having transparent electrodes and are driven by a voltage applied to the transparent electrodes, and light incident upon the liquid crystals and transmitted through the transparent electrodes is modulated to achieve display.

Another one is a system in which liquid crystals are driven by an electric filed which is nearly in parallel with the surface of a substrate between two electrodes that are formed on the same substrate, and light incident upon the liquid crystals through a gap between the two electrodes is modulated to provide display.

Features of the latter system have been disclosed in, for example, U.S. Pat. No. 5,576,867, U.S. Pat. No. 5,599,285, U.S. Pat. No. 5,598,285, U.S. Pat. No. 5,786,876, U.S. Pat. No. 5,956,111 and Japanese Patent No. 02907137. Moreover features of a multi-domain system IPS (In-Plane Switching mode) liquid crystal display have been disclosed in, for example, U.S. Pat. No. 5,745,207.

In general, an orientation process that prepares an orientation film for controlling liquid crystal molecules is done by rubbing using a rotating rubbing roller on the surface of an orientation film. However, when spaces are formed on an orientation layer, an orientation process can cause alignment defects as a result of the differences in surface level. Specifically, when spacers are formed in the display region, alignment defect can result in an improper image display.

SUMMARY OF THE INVENTION

Accordingly, an object of the present invention is to provide multi-domain system IPS (In-Plane Switching mode) liquid crystal display which have high contrast and do not suffer from improper image display. This invention provide a remarkable high contrast display (350:1) as compared to current model displays (200:1).

According to one aspect of the present invention, there is provided a black matrix formed between a pair of substrates and formed over a plurality of drain lines and gate lines, a plurality of spacers arranged under the black matrix, wherein a plurality of liquid crystal molecules aligned to a boundary direction of the black matrix in the OFF state, and having a first group and a second group in the ON state, wherein a switching angle of the second is opposite to a switching angle of the first group.

According to another aspect of the present invention, there is provided a black matrix formed between a pair of substrates and formed over a plurality of drain lines and gate lines, a plurality of spacers arranged under the black matrix, wherein a plurality of liquid crystal molecules having Y direction of an initial orientation angle, and twisted to +X direction and −X direction when a driving voltage is applied.

According to another aspect of the present invention, there is provided a plurality of liquid crystal molecules having a positive dielectric constant anisotropy and interposed between a pair of orientation layers, a black matrix formed over another of a pair of substrates in a matrix shape, a plurality of spacers formed between the black matrix and one of the pair of orientation layers, wherein a plurality of liquid crystal molecules having Y direction of an initial orientation angle, and twisted to +X direction and −X direction when a driving voltage is applied.

According to another aspect of the present invention, there is provided a plurality of liquid crystal molecules having a negative dielectric constant anisotropy and interposed between said pair of orientation layers, a black matrix formed over another of a pair of substrates in a matrix shape, a plurality of spacers formed between the black matrix and one of a pair of orientation layers, wherein said plurality crystal molecules having X direction of an initial orientation angle, and twisted to +Y direction and −Y direction when driving voltage is applied.

BRIEF DESCRIPTION OF THE DRAWINGS

FIG. 14, is a flow chart of a sectional view of a, spacer illustrating the steps A to E of fabricating a substrate 1B.

FIG. 19 is a plan view of the pixel of a liquid crystal display according to another invention of the sixteenth embodiment.

FIG. 20 is a plan view of the pixel of a liquid crystal display according to a seventh embodiment of the present invention.

DESCRIPTION OF THE PREFERRED EMBODIMENTS

This present invention will hereunder be described in more detail.

Embodiment 1

Figure 1:
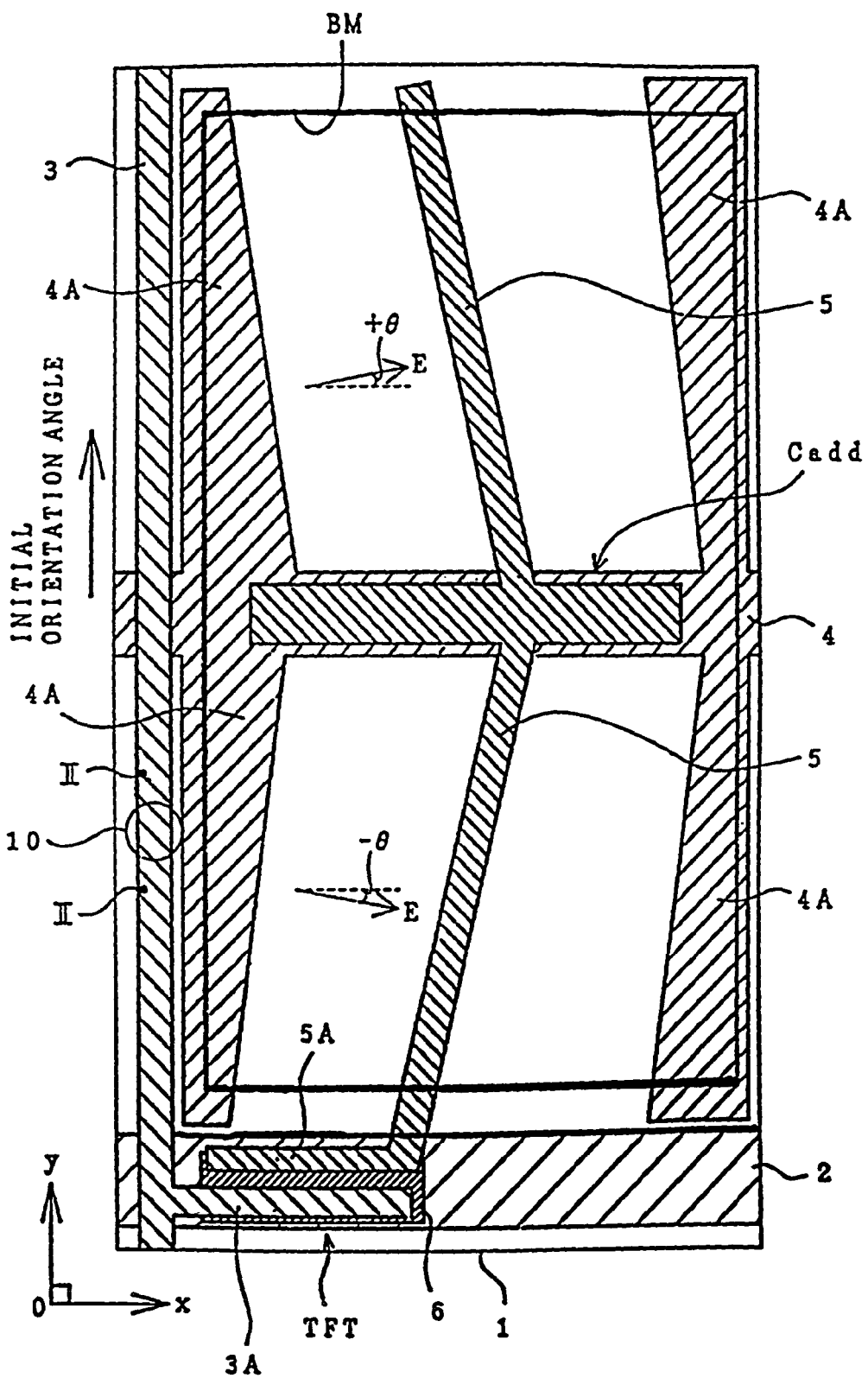
FIG. 1 is a plan view of the pixel of a liquid crystal display according to a first embodiment of the present invention.

FIG. 1 is a plan view of the pixel of a liquid crystal display according to a first embodiment of the present invention. In the first embodiment, a plurality of liquid crystal molecules having a positive dielectric constant anisotropy, and FIG. 1 shows one pixel of a plurality of pixels forming in matrix shape. Each pixel is defined in a region where two adjacent gate lines 2 and two adjacent drain lines 3 intersect. And each pixel includes a thin-film transistor TFT, a capacitor Cadd, a pixel electrode 5, a counter electrode 4A and a counter voltage line 4. The gate lines 2 and the counter voltage lines 4 extend in the X direction in the drawing and are arranged in the Y direction. The drain lines 3 extend in the Y direction and are arranged in the X direction. The pixel electrode 5 is connected to the thin-film transistor TFT. The material of the gate line 2 is selected from a group of chromium, aluminum and molybdenum, and the counter voltage line 4 is formed by the same material with the gate line 2.

A counter voltage is supplied to the counter electrodes 4A via the counter voltage line 4 from an external circuit. And the counter electrodes 4A and the counter voltage line 4 have a shape of a letter H in the each pixels. The pixel electrode 5 and the counter electrode 4A are opposed to each other, and the optical state of the liquid crystals LC (ON state) is controlled by an electric field between each pixel electrode 5 and the counter electrode 4A, thereby to control the display. The pixel electrodes 5 and the counter electrodes 4A are formed like comb teeth, and extend in a slender form in the Y direction.

Here, the pixel electrode 5 and the counter electrode 4A have a herringbone shape for the multi-domain system. The counter electrode 4A maintains the distance with the pixel electrode 5 by increasing the width of the counter electrode 4A. Hence, the face of the drain line 3 side of the counter electrode 4A is formed parallel with the drain line 3, and the face of the pixel electrode 5 side of the counter electrode 4A is formed parallel with the pixel pixel electrode 5.

Therefore, the direction of the electric field which is disposed in the upper pixel region of the counter voltage line 4 in a pixel between the pixel electrode 5 and the counter electrode 4A is different from the lower one pixel region. In FIG. 1, the direction of the electric field which is disposed at the upper pixel region has the angle of $+\theta$ with respect to the direction parallel to the counter voltage line 4, but the direction of the electric field which is disposed at the lower one has the angle of $-\theta$ with respect to the direction parallel to the counter voltage line 4.

The above-mentioned shape provides liquid crystal molecules to switch in reverse directions at each pixel region, and a light transmittance change at each pixel.

In this invention, it can prevent the inversion of luminance when the view point of the observer is at an angle with respect to the slanting direction of the liquid crystal display panel. In the first embodiment, one pixel has the difference angle of $\pm\theta$ dividing upper and lower pixel region, but it allows two adjoining two pixels to have difference angles of $+\theta$ and $-\theta$, respectively.

Thin film transistor TFT consists of the gate line 2, a drain electrode 3A, a source electrode 5A, a semiconductor layer 6 and a gate insulator (silicon nitride). An insulator is formed on the gate line 2 as a gate insulator, and the semiconductor layer 6 whose material is amorphous silicon formed on the gate insulator. A drain electrode 3A and a source electrode 5A are formed on the semiconductor layer 6; thin film transistor TFT becomes an inverted stagger type thin film transistor. The drain electrode 3A and a source electrode 5A are same layer, and the drain electrode 3A contact with the drain line, and the source electrode 5A contact with the pixel electrode, respectively.

In the first embodiment, an initial orientation angle is the Y direction, so a rubbing direction is also the Y direction. The absolute value of the angle between the drain line 3 and the direction of the electric field E is larger than the absolute value of the angle between the counter voltage line 4 and the direction of the electric field E. A capacitance Cadd consists of the pixel electrode 5, the counter voltage line 4 and the gate insulator. To form the capacitance Cadd on the counter voltage line 4, the capacitance Cadd can be larger than any region in a pixel. The capacitance Cadd functions to improve the data retentivity. A protective film PAS (silicon nitride) is formed over the transparent substrate 1A after forming a plurality of thin film transistors TFT and pixels for preventing to touch with liquid, crystal molecules. Furthermore, an orientation layer which controls an initial orientation angle of liquid crystal molecules is formed over the protective film PAS. The orientation layer is surface rubbed with a rubbing roller along with the Y direction after coating synthetic resins thereon.

Figure 2:
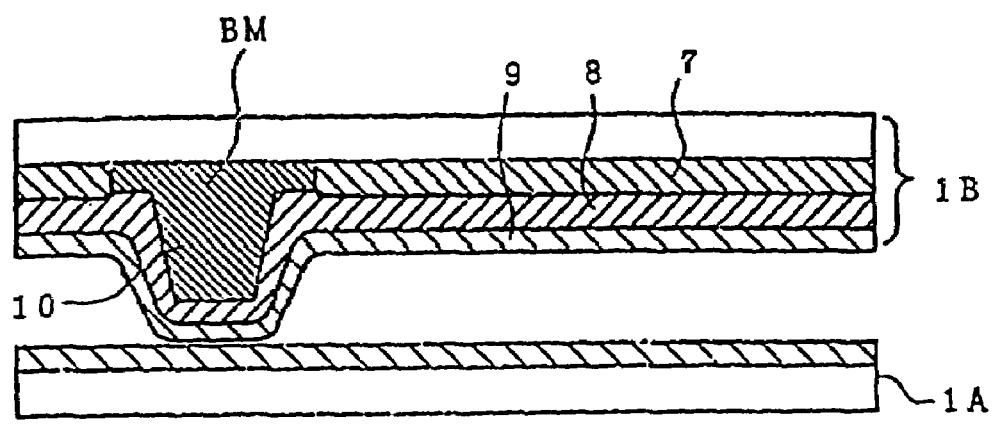
FIG. 2 is a sectional view of the pixel of a liquid crystal display cut along the line II—II in 1.

A color filter substrate 1B consists of a black matrix BM, a color filter 7 and an orientation layer 9. In FIG. 1, a boundary of the black matrix BM is shown as a plan view, and in FIG. 2 shows a sectional view of the black matrix BM. Here, the orientation layer 9 of the color filter substrate 1B is a surface rubbed with rubbing roller in the Y direction after coating synthetic resins thereon the same as the orientation layer of the transparent substrate 1A. Also, the orientation direction of each orientation layer of the transparent substrate 1A side and that of the color filter substrate 1B are the same Y direction. Therefore, a plurality of liquid crystal molecules are aligned to a boundary direction of the black matrix in the OFF state, and having the upper pixel region (a first group) and the lower pixel region (a second group) in the ON state, wherein a switching angle of the second group is opposite to a switching angle of the first group.

A spacer 10 is formed between the transparent substrate 1A and the color filter substrate 1B and formed over the drain line 3 to keep a gap therebetween.

FIG. 2 is a sectional view of the pixel of a liquid crystal display cut along the line II—II in FIG. 1. The black matrix BM is formed on the color filter substrate 1B which faces with liquid crystal molecules, the spacer 10 is made of the black matrix BM, the spacers 10 function to keep a gap between the transparent substrate 1A side and the color filter substrate 1B.

The black matrix BM is formed by the twice selective etching of a photo lithography method, the first selective etching to make the spacer 10 after coating black matrix material very thick, and the second selective etching to make a hole for the color filter 7. The black matrix BM is formed with either the drain line 3 or the gate line 2 thereon; a light transmittance region between the pixel electrode 5 and the counter electrode 4A are formed in an open region of the black matrix BM. An end of the pixel electrode 5 and the edge of the counter electrode 4A are covered with the black matrix BM, because this region is not the uniform electric field area between the pixel electrode 5 and the counter electrode 4A.

The open region of the black matrix BM would be able to improve an aperture ratio if it is large enough. On the other hand, the open region of the black matrix should be designed to cover the unnecessary electric field between the drain line 3 and the counter electrode 4A, and the improper electric field between the pixel electrode 5 and the edge of counter electrode 4A. The color filter 7 is formed at the open region of the black matrix BM. Then, the over coating film 8 is formed over the color filter 7. Finally, the orientation layer 9 is formed over the over coating film 8.

Figure 3:
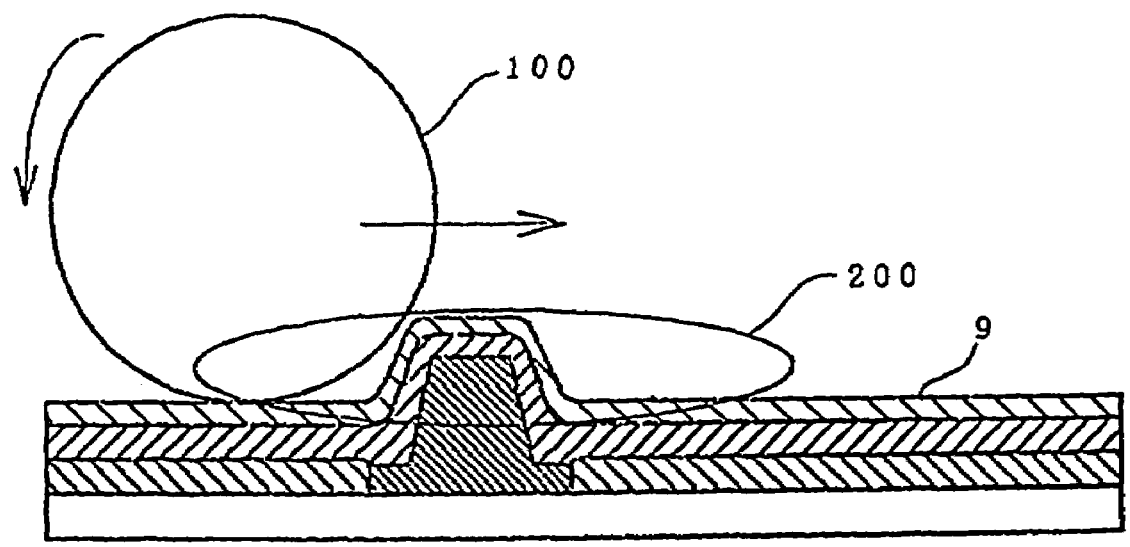
FIG. 3 is a sectional view of the spacer in illustration of a alignment defect on an orientation layer.

FIG. 3 is a sectional view of the spacer 10 in illustration of an alignment defect on an orientation layer. The orientation layer 9 has its surface rubbed with rubbing roller 100 in the right direction (in the Y direction in FIG. 1). Here, an area 200 is not orientated and causes an alignment defect with the spacer 10. Hence, in the area 200, the rubbing roller 100 out of contact with surface of the orientation layer 9, is not rubbed with the rubbing roller 100. Therefore, in this invention, the area 200 brings in the Y direction by using the multi-domain system IPS, and covers the area 200 by the black matrix. As a result, this combination provides remarkably high contrast (350:1) for a liquid crystal display.

Moreover, the spacer 10 is available to form over the counter voltage line 4 as other embodiment. As the counter voltage. As the counter voltage line 4 can be designed wider than the gate line 2, the drain line 3 and another electrode, the area 200 can be covered by the counter voltage line 4 easily.

Embodiment 2

Figure 4:
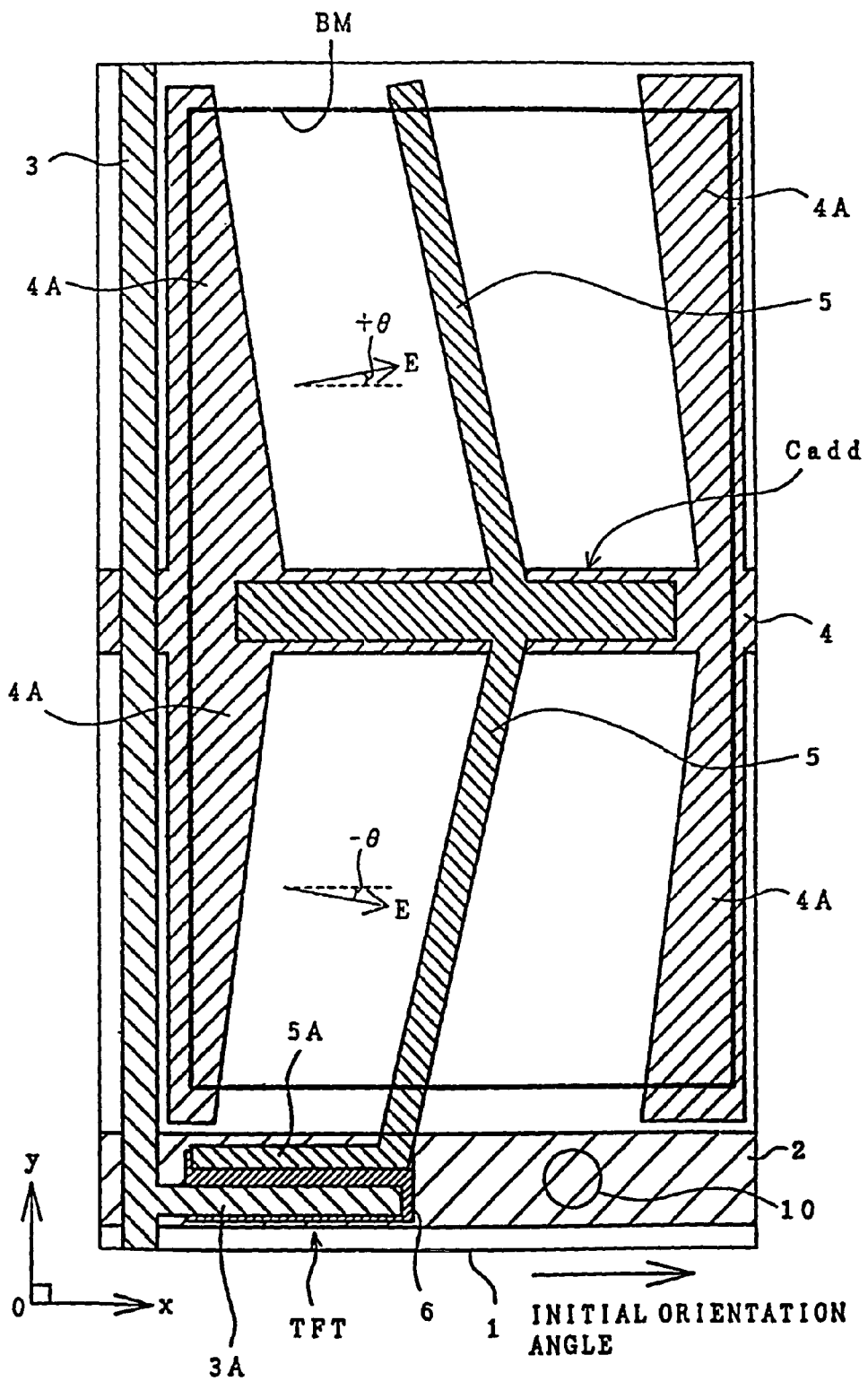
FIG. 4 is a plan view of the pixel of a liquid crystal display according to a second embodiment of the present invention.

FIG. 4 is a plan view of the pixel of a liquid crystal display according to a second embodiment of the present invention. In the second embodiment, a plurality of liquid crystal molecules having a negative dielectric constant anisotropy, rubbing direction (initial orientation angle) is in the X direction, so the spacer 10 is disposed over the gate line 2. As a result, even if alignment defects are formed the area 200 on the gate line 2, the area 200 is hid by the black matrix BM. A plurality of liquid crystal molecules have the X direction for an initial orientation angle, and are twisted to +Y direction and −Y direction while a driving voltage is applied.

Embodiment 3

Figure 5:
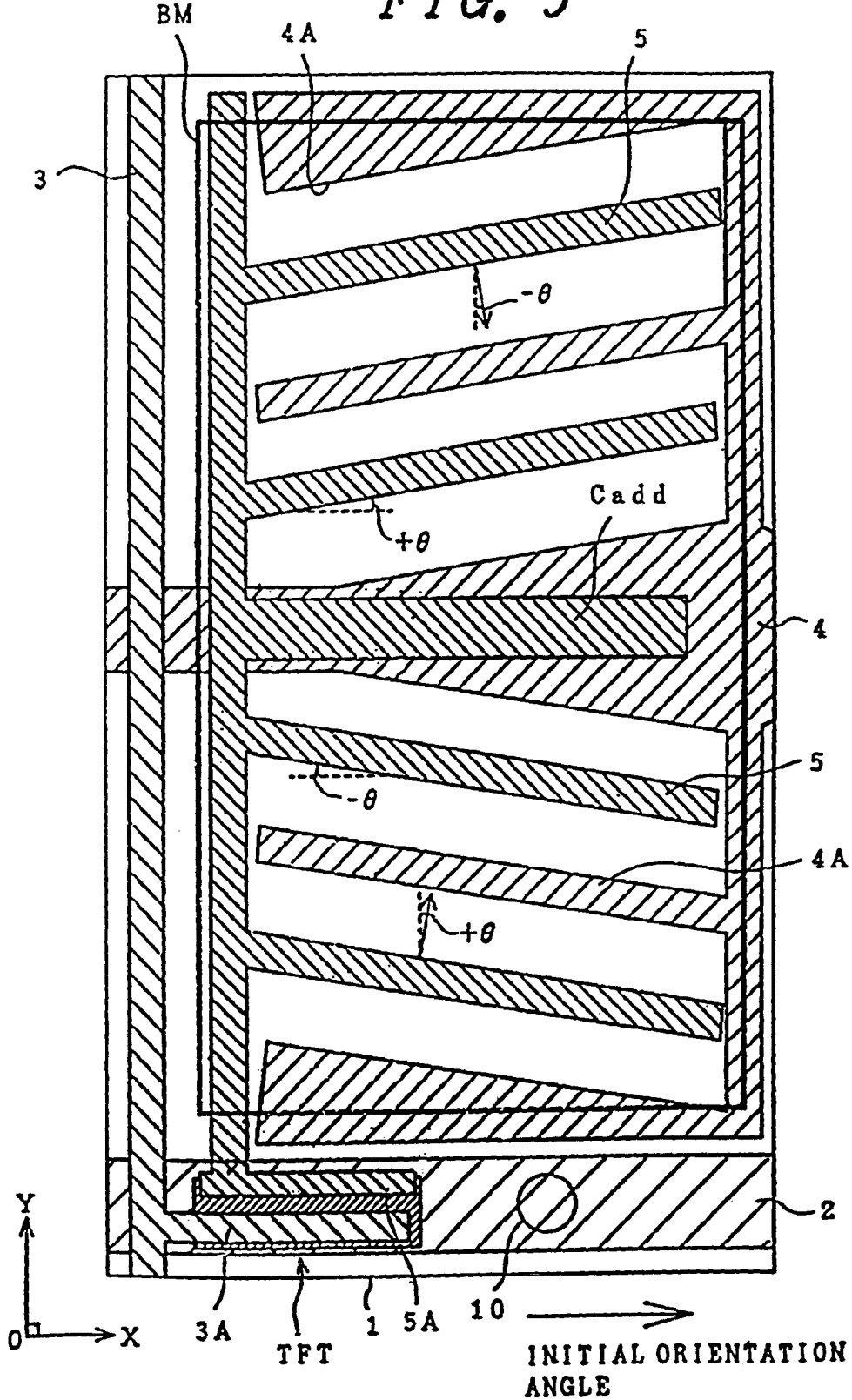
FIG. 5 is a plan view of the pixel of a liquid crystal display according to a third embodiment of the present invention.

FIG. 5 is a plan view of the pixel of a liquid crystal display according a third embodiment of the present invention. In the embodiment, a plurality of liquid crystal molecules having a positive dielectric constant anisotropy, the pixel electrodes 5 and the counter electrodes 4A are formed in the direction X which are parallel with the gate line 2. In the third embodiment, an rubbing direction (initial orientation angle) is in the X direction.

In FIG. 5, the direction of the electric field which is disposed at the upper pixel region has the angle of $-\theta$ with respect to the direction perpendicular to the counter voltage line 4, but the direction of the electric field which is disposed at the lower pixel region has the angle of $+\theta$ with respect to the direction perpendicular to the counter voltage fine 4. The above-mentioned shape provides the liquid crystal molecules with the ability to switch in reverse directions at each pixel region, and a light transmittance change in a pixel.

As each counter electrode 4A is arranged parallel with each pixel electrode 5, each of the counter electrodes 4A has a wider portion than the pixel electrodes 5. The absolute value of the angle between the drain line 3 and the direction of the electric field E is smaller than the absolute value of the angle between the gate line 2 and the direction of the electric field E. In this embodiment, an observer does not recognize the inversion of luminance when the view point of the observer is at an angle with respect to the slanting direction of the liquid crystal display panel.

A rubbing direction (initial orientation angle) of the transparent substrate 1A and the color filter substrate 1B are in the same X direction as the direction of gate line 2, so the spacer 10 is disposed over the gate line 2. As a result, even if alignment defects are made in the area 200 on the gate line 2, the area 200 is hidden by the black matrix BM in this embodiment.

This embodiment achieves both advantages of preventing the inversion of luminance when the view point of the observer is at an angle with respect to the slanting direction of the liquid crystal display panel, and of providing remarkably high contrast (350:1) for the liquid crystal display.

Embodiment 4

Figure 6:
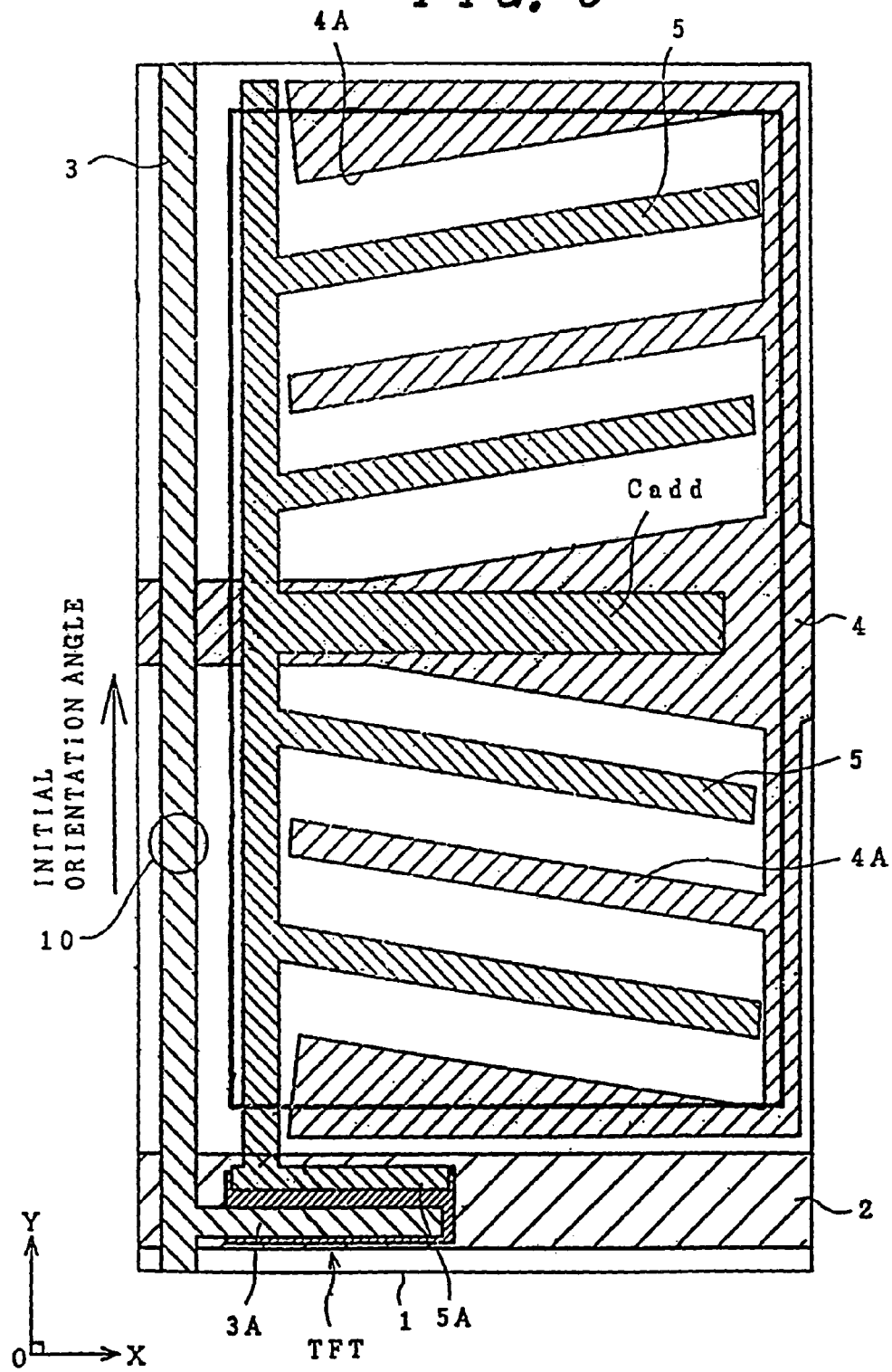
FIG. 6 is a plan view of the pixel of a liquid crystal display according to a fourth embodiment of the present invention.

FIG. 6 is a plan view of the pixel of a liquid crystal display according to a fourth embodiment of the present invention. In the fourth embodiment, a plurality of liquid crystal molecules having a negative dielectric constant anisotropy, a rubbing direction (initial orientation angle) is in the Y direction. The spacer 10 is disposed over the drain line 3. As a result, even if alignment defects are made in the area 200 on the drain line 3, the area 200 is hidden by the black matrix BM this embodiment.

That is, it can prevent the inversion of luminance when the view point of the observer is at an angle with respect to the slanting direction of the liquid crystal display panel.

This embodiment achieves the of advantages both of preventing the inversion of luminance when the view point of the observer is at an angle with respect to the slanting direction of the liquid crystal display panel and of providing remarkably high contrast (350:1) for the liquid crystal display.

Embodiment 5

Figure 7A:
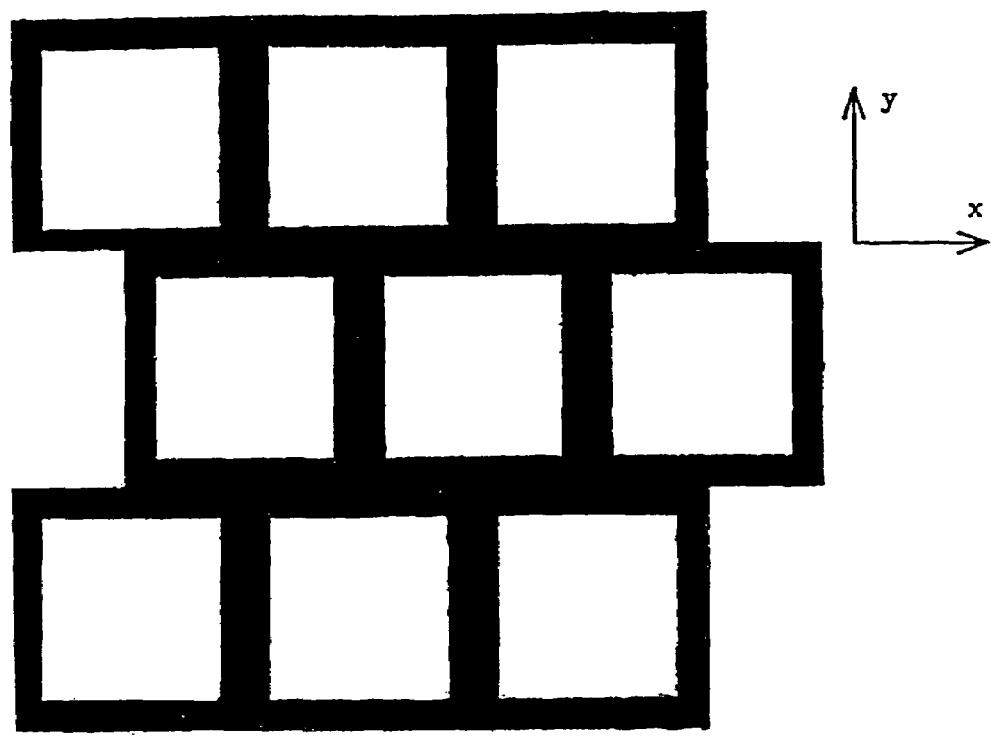
FIG. 7 is a plan view of the pixel of a liquid crystal display according to a fifth embodiment of the present invention.
Figure 7B:
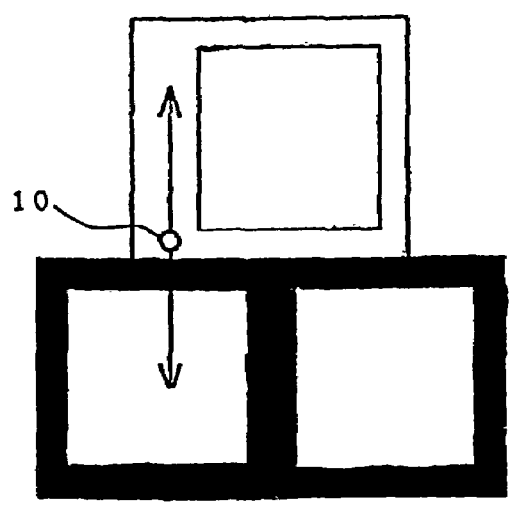

FIG. 7 is a plan view of the pixel of a liquid crystal display according to a fifth embodiment of the present invention. FIG. 7A shows a plan view of an arrangement of a plurality of pixel. An black frames shows the black matrix BM, it's open region corresponds to each pixel. The arrangement in FIG. 7A is called the delta arrangement, one group of pixels in the X direction (a row direction) is offset to the side by ½ pitch relative to another group of pixels. As the delta arrangement, with pixels of red, green and blue adjacent each other, is useful for a color active matrix liquid crystal display. In the fifth embodiment 5, the spacer 10 is formed over the gate line 2, and, the rubbing direction (initial orientation angle) is in the X direction. As a result, even if alignment defects are made the are made in the area 200 on the gate line 2, the area 200 is hidden by the black matrix BM. FIG. 7B shows a plan view of the delta arrangement, when the spacer 10 is formed over the drain line 3 and the rubbing direction (initial orientation angle) is in the Y direction. In this case, alignment defects inside the pixel region, cause an improper image display.

Embodiment 6

The delta arrangement may be designed such that one group pixels of the Y direction (a column direction) is offset to one side by ½ pitch relative to another group of pixels. In a sixth embodiment, the spacer 10 is formed over the drain line 3, the rubbing direction (initial orientation angle) is in the direction along with the drain line 3.

Embodiment 7

Figure 8:
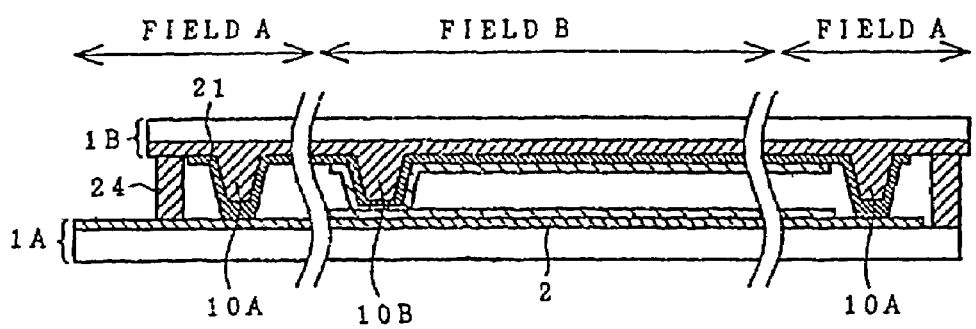
FIG. 8 is a sectional view of the liquid crystal display according to a seventh embodiment of the present invention.

FIG. 8 is a sectional view of the liquid crystal display according to a seventh embodiment of the present invention. FIG. 8 shows a sectional view of the spacer 10 of a liquid crystal display cut along the gate line 2 in FIG. 1. The spacer 10 consists of the spacer 10A which is formed at both ends of the gate line 2. (FIELD A), and the spacer 10B which is formed at a pixel region (FIELD B). A sealing member 24 seals between the transparent substrate 1A and the color filter substrate 1B. Furthermore, a conductive layer 21 is formed under the spacer 10A and 10B forming on the color filter substrate 1B side, which is contacted with the gate line 2. Hence, this embodiment covers the spacer 10A with the conductive layer 21 and electrically contracts the gate line 2 with the spacer 10A. If the gate line 2 breakdown in its wiring at a part in FIELD B, scanning signals would be supported via the conductive layer 21 at FIELD A. The seventh embodiment is useful for video signals of the drain line 3 as another embodiment.

Embodiment 8

Figure 9:
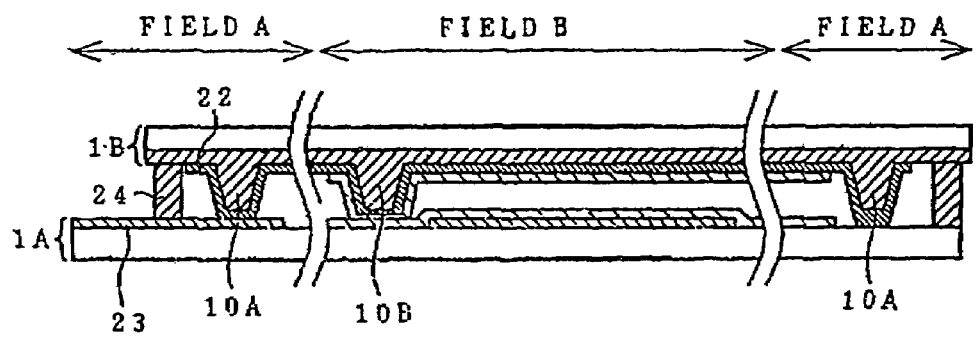
FIG. 9 is a sectional view of the liquid crystal display according to a eight embodiment of the present invention.

FIG. 9 is a sectional view of the liquid crystal display according to an eight embodiment of the present invention. FIG. 9 shows a sectional view of the spacer 10 of a liquid crystal display cut along the counter voltage line 4 in FIG. 1. The spacer 10 consists of the spacer 10A which is formed at both ends of the gate line 2 (FIELD A), and the spacer 10B which is formed at a pixel region (FIELD B). A sealing member 24 seals between the transparent substrate 1A and the color filter substrate 1B. Furthermore, another counter voltage line 22 is formed under the spacer 10A and 10B forming on the color filter substrate 1B side in this embodiment. A conductive layer 23 is disposed like FIG. 9, and connects between the counter voltage line 22 and an external terminal for a counter, voltage. Hence, this embodiment covers the spacer 10A with the counter voltage line 22, and electrically contacts the conductive layer 23 for a counter voltage.

Embodiment 9

It is clear that the spacer 10 should be formed on the color filter substrate side to prevent any deterioration in the characteristics of a thin film transistor. In the process of the spacer forming on the same substrate with a film transistor, a step increasing for a selective etching by a photo lithography method is added, wherein the etching solvent causes deterioration of the characteristics of the thin film transistor.

However, the spacer 10 should be formed on the transparent substrate 1A side, when the alignment between the transparent substrate, 1A, and the color filter substrate 1B is more important than the deterioration in the characteristics of a thin film transistor.

Embodiment 10

Figure 10:
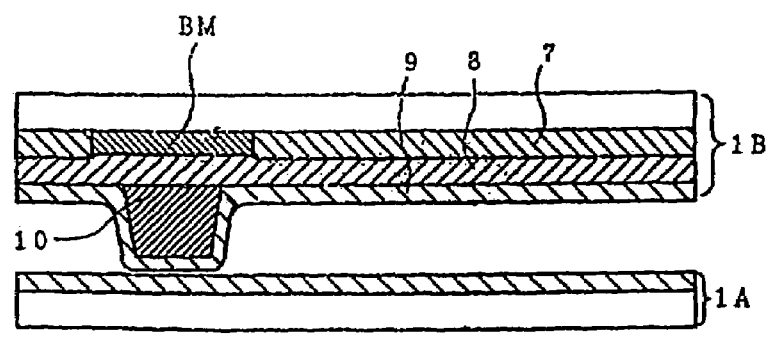
FIG. 10 is a sectional view of the spacer of a liquid crystal display according to a tenth embodiment of the present invention.

FIG. 10 is a sectional view of the spacer of a liquid crystal display according to a tenth embodiment of the present invention. The black matrix BM and the color filter 7 are formed under the color filter substrate 1B side which is opposite to the liquid crystal, an overcoating film 8 made from a thermosetting resin film is in formed thereunder. The spacer 10 made from a photocurable resin film, is formed under the over coating film 8. To make the spacer 10 from photo curable resin film, a selective etching method is excluded from the process of the spacer 10, manufacturing steps for the color filter substrate 1B become simple and low cost. The embodiment 10 is useful for, the transparent substrate 1A side having the spacer 10 as another embodiment.

Embodiment 11

Figure 11A:
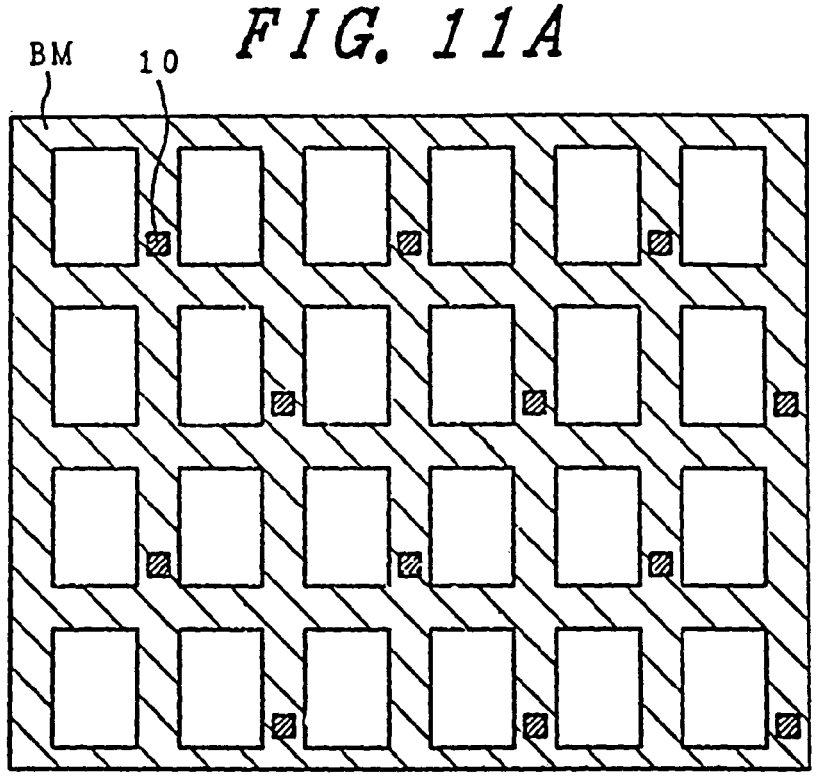
FIG. 11A is a plan view of the pixel of a liquid crystal display according to a ninth embodiment of the present invention.

FIG. 11A is a plan view of the pixel of a liquid crystal display according to an eleventh embodiment of the present invention. The spacers are uniformly arranged in a plurality of pixels like the same number of pixels have the same number of the spacers. To decrease alignment defects caused by spacer, a pluralify of pixels have one spacer uniformly.

Embodiment 12

Figure 11B:
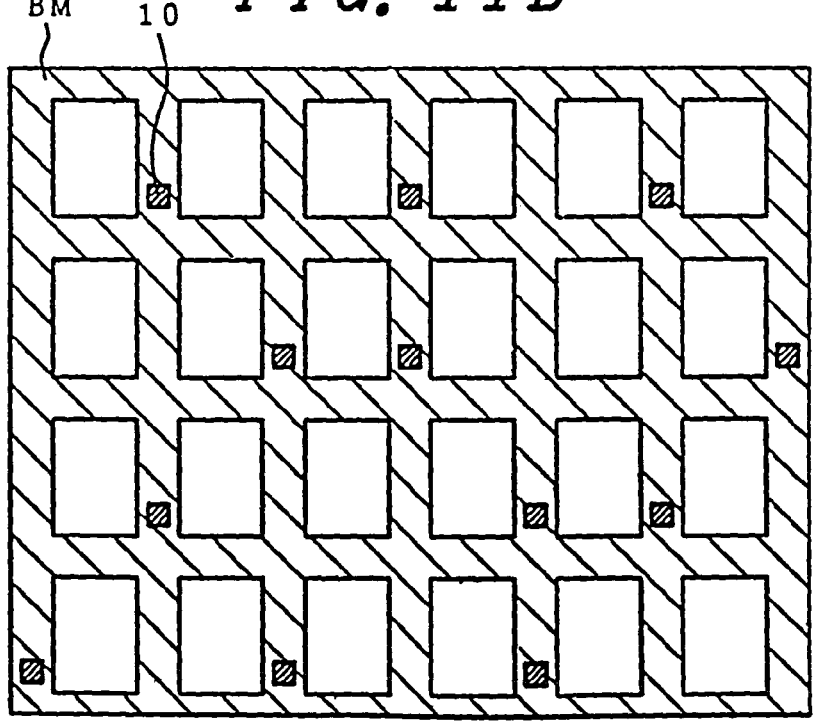
FIG. 11B is a plan view of the pixel of a liquid crystal display according to a tenth embodiment of the present invention.

FIG. 11B is a plan view of the pixel of a liquid crystal display according to a twelfth embodiment of the present invention. A plurality of pixels are dotted with a plurality of spacers. Thus, the spacers are not uniformly arranged in a plurality of pixels like FIG. 11A. If alignment defects is uniform, an observer could see them easily.

Embodiment 13

Figure 12:
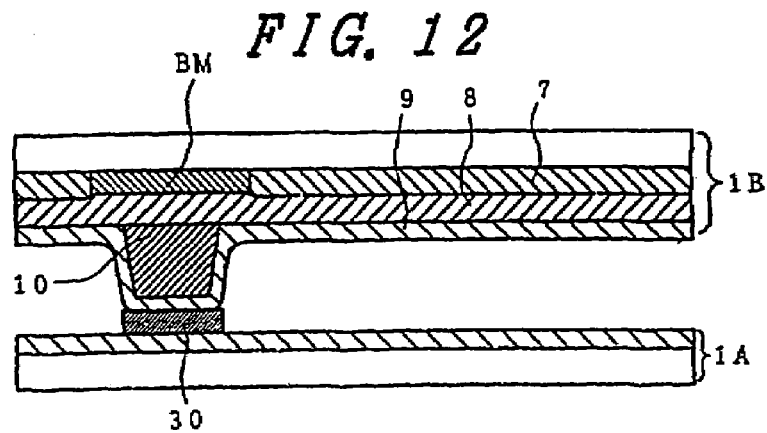
FIG. 12 is a sectional view of the spacer of a liquid crystal display according to an eleventh embodiment 11 of the present invention.

FIG. 12 is a sectional view of the spacer of a liquid crystal display according to a thirteenth embodiment of the present invention. The spacer 10 adheres to an orientation layer formed on the transparent substrate 1A by an adhesive 30. The portion where the spacer 10 adheres to an orientation layer is touched between orientation layers. In general, the bonding force between the orientation layers having the same material is weak. Consequently, the adhesive 30 including the Si coupling material is needed between orientation layers.

FIG. 13 is a flow chart of sectional views of a spacer illustrating the steps A to E of fabricating a color filter substrate 1B.

Figure 13A:
FIG. 13 is a flow chart of a sectional view of A spacer illustrating the steps A to E of fabricating a substrate 1B.

[Step 1]
FIG. 13A shows a color filter substrate 1B having the spacer10 coating an orientation material.

Figure 13B:

[Step 2]
First, the color filter substrate 1B is moved near a vessel filled with adhesive material 30 like FIG. 13B. Then, the color filter substrate 1B is positioned to apply the top of the spacer 10 with adhesive material.

Figure 13C:

[Step 3]
FIG. 13C shows, the spacer 10 having the adhesive 30.

Figure 13D:

[Step 4]
Second, the transparent substrate 1A and-the color filter substrate 1B are positioned facing each other shown in FIG. 13D.

Figure 13E:

[Step 5]
Finally, by applying heat to the pair of substrates, the adhesive 30 begins going solidify. (FIG. 13E).

FIG. 14A is a flow chart of sectional views of a spacer illustrating the steps A to E of fabricating a substrate 1B according to another embodiment.

[Step 1]
FIG. 14A shows a color filter substrate 1B having the spacer 10 formed on an orientation material.

[Step 2]
First, the color filter substrate 1B is coated by the roller 31 soaking in the a vessel filled with adhesive material shown in FIG. 14B. As a result, the color filter substrate 1B is formed with the tops of the spacer 10 covered with adhesive material.

[Step 3]
FIG. 14C shows the spacer 10 having the adhesive 30.

[Step 4]
Second, the., transparent substrate 1A, and the color filter substrate 1B are positioned facing each other shown in FIG. 14D.

[Step 5]
Finally, by applying heat to the pair of substrates, then the adhesive 30 begins to solidify. (FIG. 14E).

Embodiment 14

Figure 15:
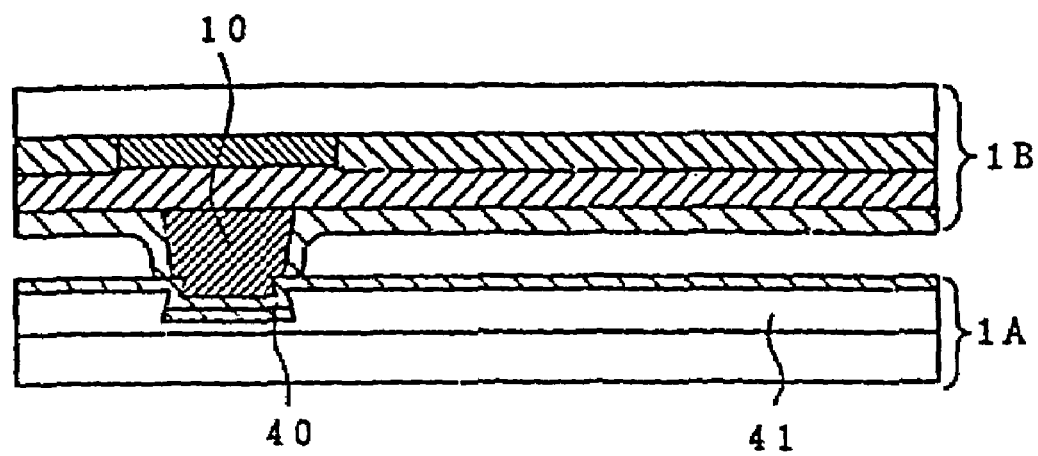
FIG. 15 is a sectional view of the spacer of A liquid crystal display according to a fourteenth embodiment of the present invention.

FIG. 15 is a sectional view of the spacer of a liquid crystal display according to a fourteenth embodiment of the present invention A concave 40 is formed on the transparent substrate 1A as a counter tapered shape of a protective film 41 whereby adheres the spacer 10 with the protective film 41 via the concave 40. In the embodiment, the concave 40 is used instead of the adhesive 30.

Figure 16:
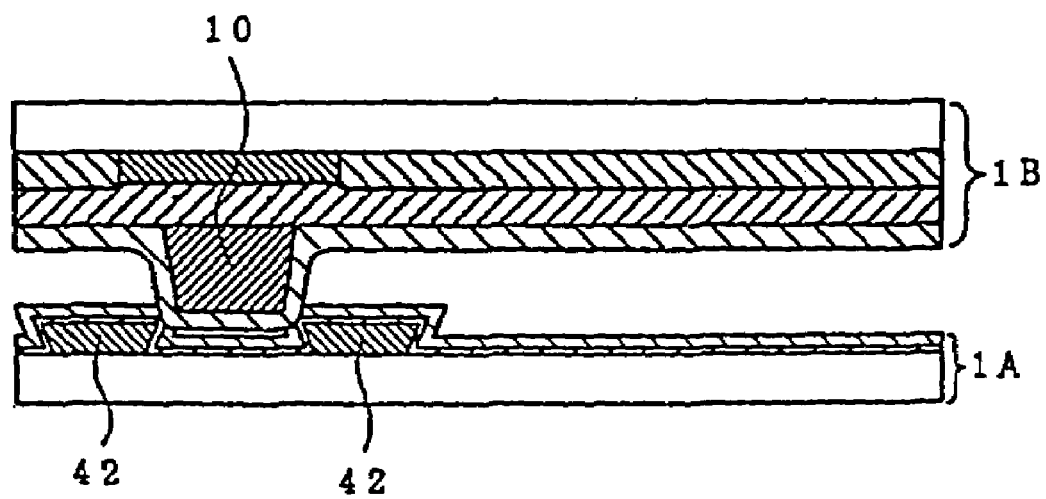
FIG. 16 is a sectional view of the spacer of a liquid crystal display according another invention of the fourteenth embodiment.

FIG. 16 is a sectional view of the spacer of a liquid crystal display according to another invention of the fourteenth embodiment. A concave 42 is formed on the transparent substrate 1A with the gate line 2 or the drain line 3, wherein the concave 42 fits with the spacer 10. In this embodiment, the concave 42 is used instead of the adhesive 30 or the concave 40 Moreover, an area between the concaves 42 may be formed larger than the width of the spacer 10, as the sealing material 24 holds a gap of substrates correspond to the perpendicular direction. Therefore, the concaves 42 function as holding material for a gap of substrates correspond to the parallel direction.

Embodiment 15

Figure 17:
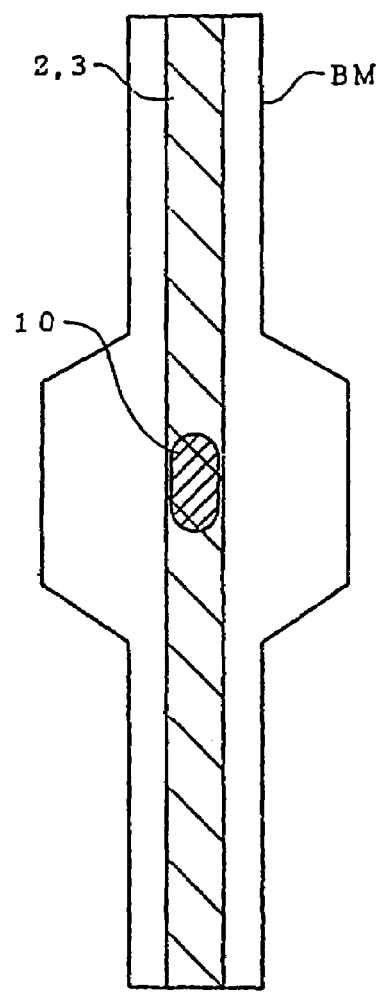
FIG. 17 is a sectional view of the spacer of a liquid crystal display according to a fifteenth embodiment of the present invention.

FIG. 17 is a sectional view of the spacer of a liquid crystal display according to a fifteenth embodiment of the present invention. The spacer 10 is formed over the drain over line 3, the black matrix BM's pattern adjacent to the spacer 10 is formed wider than the other portions. In the embodiment 15, a rubbing direction of the orientation layer follows with the drain line 3. When an alignment defect is so large that the black matrix BM can not hide it perfectly, the embodiment 15 is useful thereby.

Embodiment 16

Figure 18:
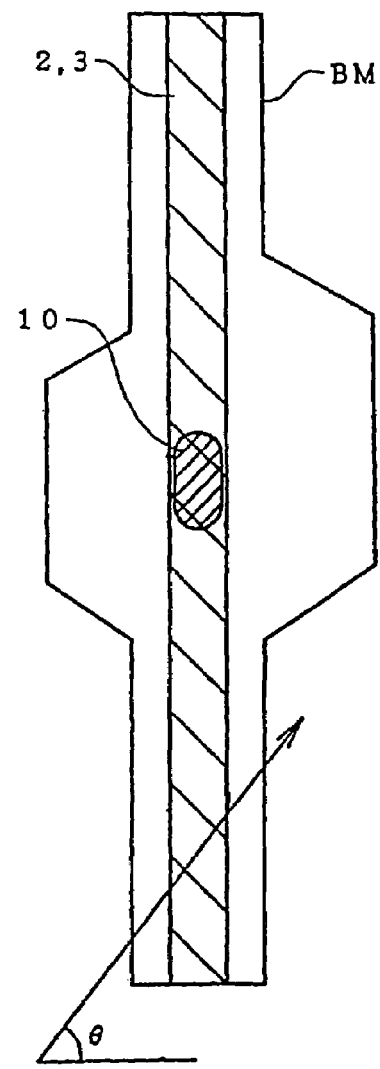
FIG. 18 is a plan view of the pixel of a liquid crystal display according to a sixteenth embodiment of the present invention.

FIG. 18 is a plan view of the pixel of a liquid crystal display according to a sixteenth embodiment of the present invention. In this embodiment, a rubbing direction of an orientation layer has an angle θ, whereby alignment defects of the orientation layer caused by the spacer 10 also appear at an angle θ. As alignment defects of the orientation layer are related to the rubbing direction, therefore the right black matrix BM's pattern is wider than the left black matrix BM's pattern.

In other words, the black matrix BM's pattern covering the spacer 10 is needed as an outline whose shape is a circle with the center of the spacer, the radius of the circle depending on the occurrence of alignment defects.

FIG. 19 is a plan view of the pixel of a liquid crystal display according another invention of the sixteenth embodiment. It allows the black matrix BM's pattern covering the spacer 10 to form at one side.

Embodiment 17

FIG. 20 is a plan view of the pixel of a liquid crystal display according to a seventeenth embodiment of the present invention. The spacer 10 is formed over the gate line 2 or the drain line 3. A shield layer 50 is disposed adjacently both sides of the spacer 10. In this embodiment, the shield layer 50 is different layer from the black matrix BM, the gate line 2 and the drain line 3. The rubbing direction of the orientation layer is the direction along with the gate line 2 or the drain line 3. As alignment defects the orientation layer are related to the rubbing direction, the shield layer 50 is arranged wider than the field occurring alignment defects.

Moreover, it allows the shield layer 50 to form the same layer with the gate line 2 or the drain line 3, so as to be united with the gate line 2 or the drain line 3. When the shield layer 50 is different layer from the drain line 3, the shield layer 50 is made of the same material of the counter voltage line 4. When the shield layer 50 is different layer from the gate line 2, the shield layer 50 is made of the same material of the drain line 3. In another embodiment, it allows a rubbing direction of an orientation layer to have an angle θ, wherein the shield layer 50 is formed wider than he field occurring alignment defect.

Embodiment 18

Figure 21:
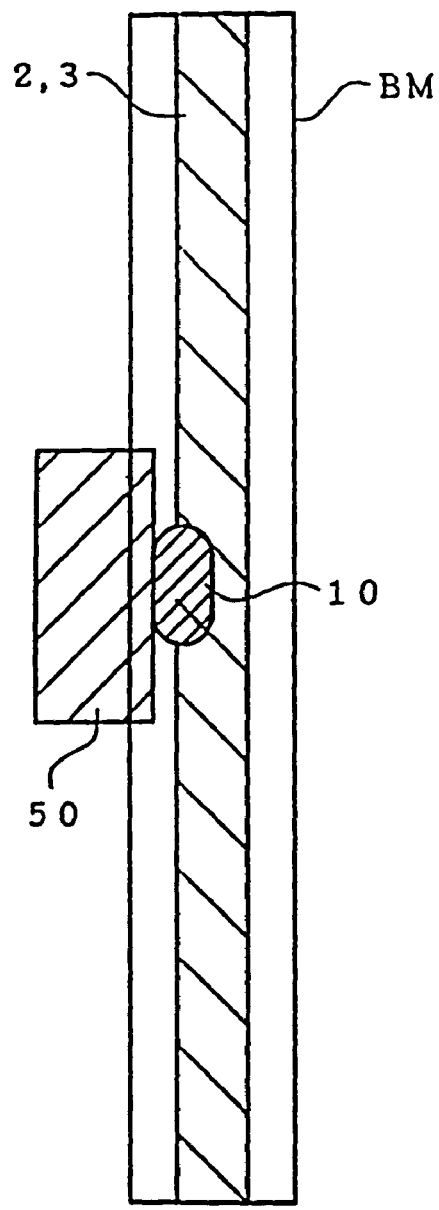
FIG. 21 is a plan view of the pixel of a liquid crystal display according to an eighteenth embodiment of the present invention.

FIG. 21 is a plan view of the pixel of a liquid crystal display according to an eighteenth embodiment of the present invention. The spacer 10 is formed over the gate line 2 or the drain line 3, and a shield layer 50 is disposed at the one side of the spacer 10. In more detail, the shield layer 50 is only formed on the side occurring alignment defect. In this way, an aperture ratio of a pixel can be improved more than embodiment 17.

Embodiment 19

Figure 22:
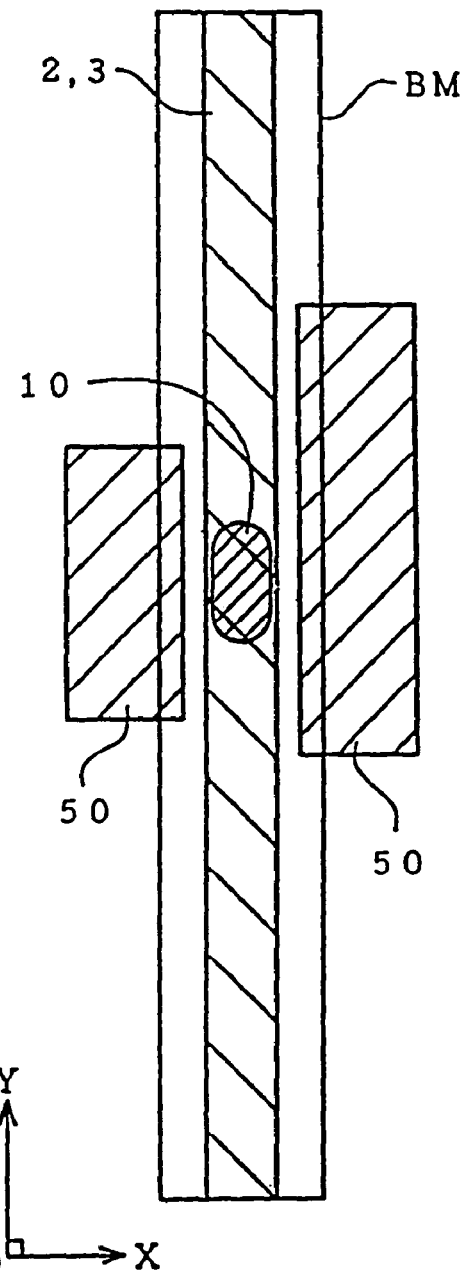
FIG. 22 is a plan view of the pixel of a liquid crystal display according to a nineteenth embodiment of the present invention.

FIG. 22 is a plan view of the pixel of a liquid crystal display according to a nineteenth embodiment of the present invention. The shield layer 50 is disposed adjacent both sides to the spacer 10. In this embodiment, the right side of the shield layer 50 is longer in the Y direction than the left side.

As alignment defects of the orientation layer are related to the rubbing direction, the shield layer 50 is longer in the right than in the left. In other words, the shield layer 50 is needed as an outline whose shape is a circle with the center of the spacer, the radius of the circle depending on the occurrence of alignment defect.

Embodiment 21

Figure 23:
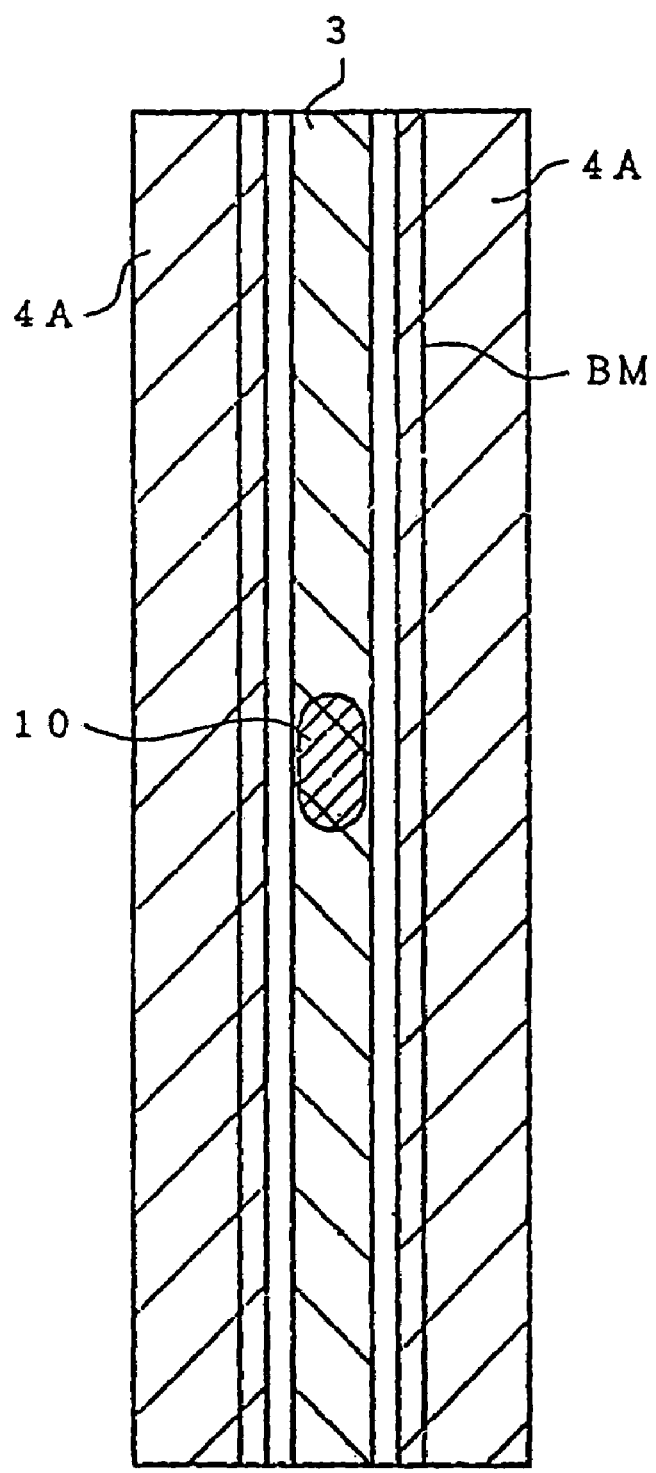
FIG. 23 is a plan view of the pixel of a liquid crystal display according to a twenty-first embodiment of the present invention.

FIG. 23 is a plan view of the pixel of a liquid crystal display according to a twenty-first embodiment of the present invention. In the embodiment 17–20, the shield layer 50 only functions as light shielding material, but this embodiment makes use of the shield layer 50 as any electrodes. In FIG. 23, the counter electrodes 4A which is disposed on the both sides of the drain line 2 have the function as the shield layer 50. If the width of the counter electrodes 4A is formed enough to hide alignment defects perfectly, the initial orientation angle would be designed not to depend on the presence of alignment defects. The reliability of the design improves by this embodiment.

Embodiment 22

Figure 24A:
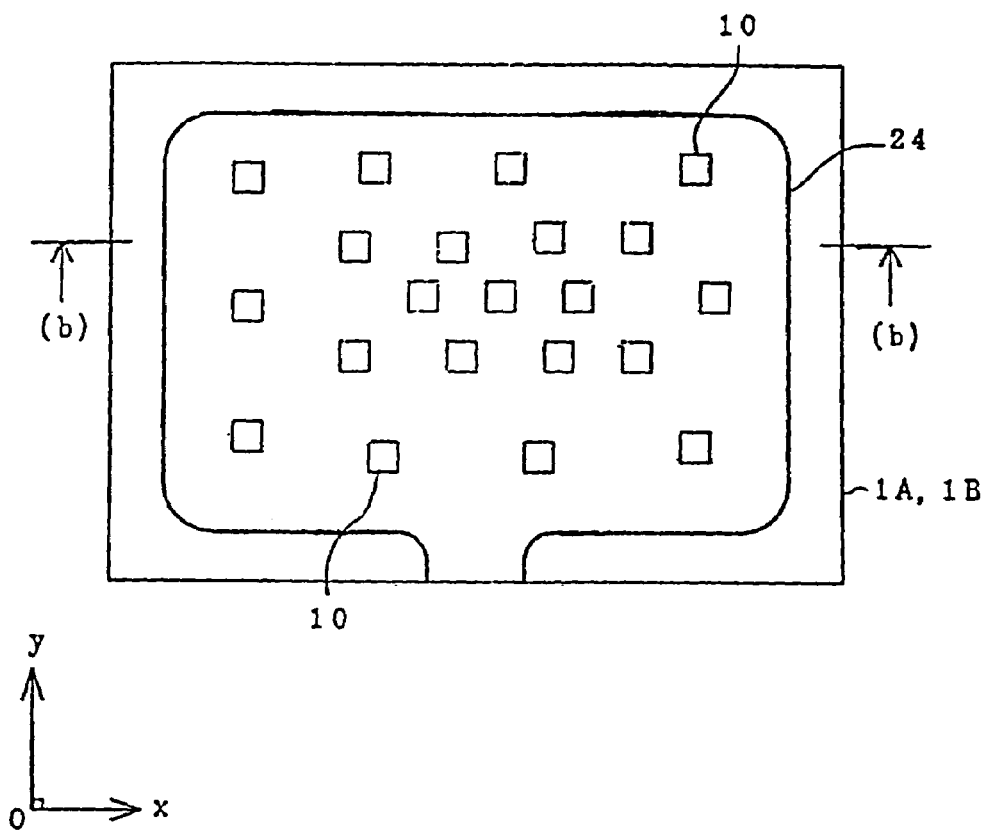
FIG. 24 is a plan view of the pixel of a liquid crystal display according to a twenty-second embodiment of the present invention.
Figure 24B:
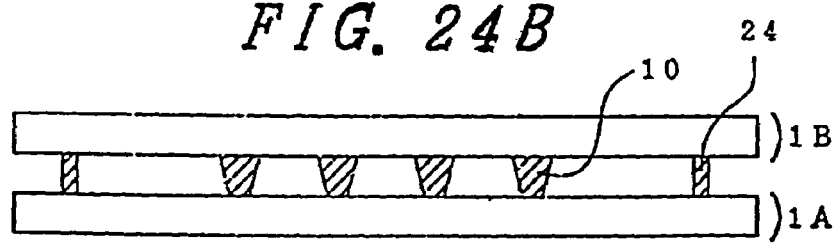

FIG. 24A is a plan view of the pixel of a liquid crystal display according to a twenty-second embodiment of the present invention. FIG. 24B is a sectional view of the pixel of a liquid crystal display cut along the line b—b in FIG. 24A. A pair of the transparent substrate 1A and the color filter substrate 1B face each other, the sealing material 24 is formed between the substrates as a frame to keep a gap between the substrates thereby. The spacer 10 is arranged inside the sealing material 24 to keep a gap at the display region thereby. The spacer 10 is formed on on of a pair of the substrates, every spacer having the same square measurement where the spacer touches the other of the pair of substrates.

In addition, the number of spacers 10 which are disposed at the center of the display region is more than at any other portion of the display region. Thus, the density of the spacers forming near the sealing material 24 is less than the density of the spacers forming at the center of the display region. By definition, the density of spacers is number of spacers per 1 $cm^2$ or 1 $mm^2$. So, the spacers which are disposed far from the sealing material 24 are required for the gap maintenance force in proportion to the size of the liquid crystal display panel. In general, the thickness of a substrate for LCD is 0.7 mm or less, the large size LCD substrate bends easily by virtue of its weight. In this embodiment, many spacers 10 keep a gap between substrates, preventing bending in large size LCD panels.

The spacer 10 is formed like the twenty-second embodiment by the selective etching of a photo-lithography method. Moreover, the, density of the spacer from the center to the edge of the substrate should change smoothly, and not suddenly. If the density of the spacer changes suddenly, the gap between substrates would not be uniform. In this embodiment, it allows the density of the spacer to be different from the center portion in the direction and the Y direction. Hefice, the density of the spacer at the center portion in the X direction is more than in the Y direction to prevent A substrate from bending efficiently.

Embodiment 23

Figure 25:
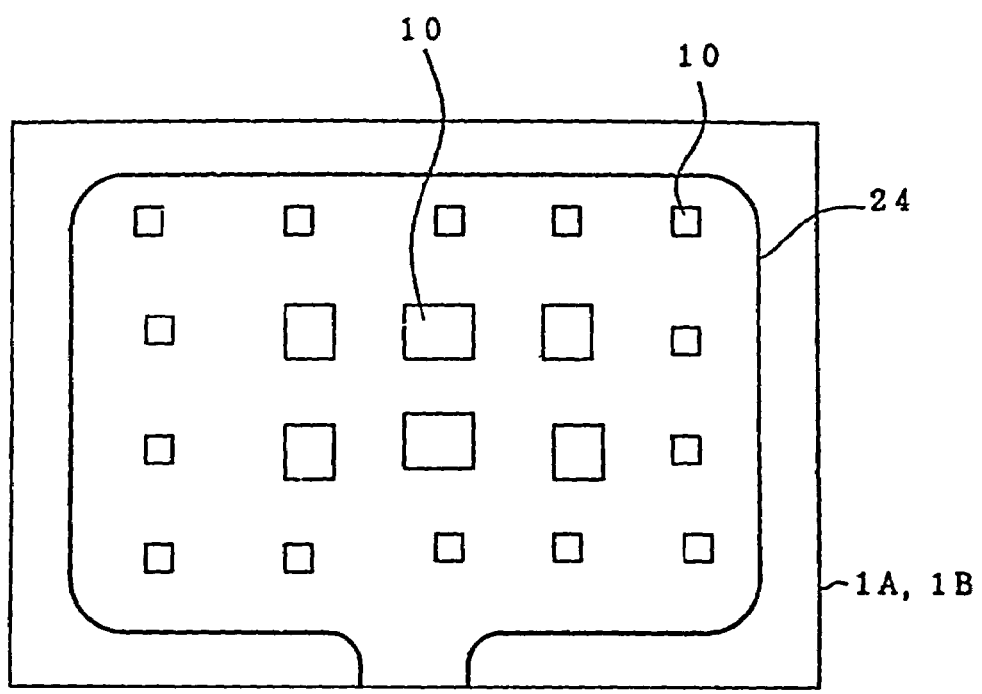
FIG. 25 is a plan view of the pixel of a liquid crystal display according to a twenty-third embodiment of the present invention.

FIG. 25 is a plan view of the pixel of a liquid crystal display according to a twenty-third embodiment of the present invention. The spacers 10 are arranged uniformly, but the width of the spacers 10 disposed at the center of a display region is wider than other spacers 10 in other region. Hence, a square measure where the spacers touch the substrates is different between the center region and the edge region. The spacer 10 is formed like the twenty-second embodiment by a selective etching of a photo-lithography method. Moreover, it allows the material strength of spacers to be different between the center region and the edge region.

Embodiment 24

In a twenty-fourth embodiment, the spacer 10 is not only formed in the pixel whose color filter is green. Rather, the spacer 10 is formed selectively in the pixels whose color filters are red or blue. Because green is the highest light transmittance color among red, green and blue, an observer can recognize an improper image display in green pixel easily.

Embodiment 25

Figure 26:
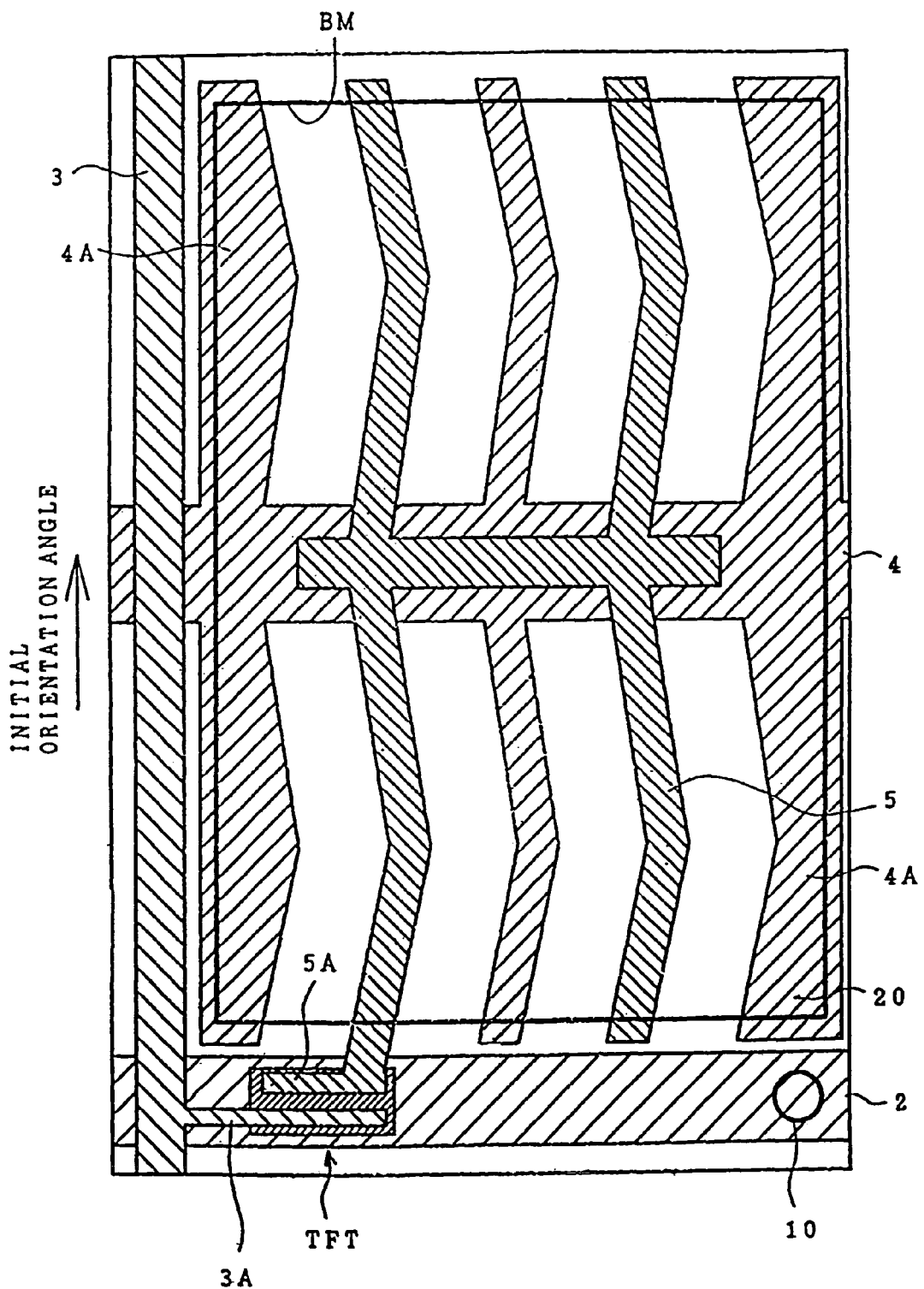
FIG. 26 is a plan view of the pixel of a liquid crystal display according to a twenty-fifth embodiment of the present invention.

FIG. 26 is a plan view of the pixel of a liquid crystal display according to a twenty-fifth embodiment of the present invention. In this embodiment, a portion 20 functions as a shield material to hide alignment defects which are caused by the rubbing in the initial orientation direction. Moreover, in this embodiment, the portion 20 combines the shield material and the counter electrode 4A which is arranged at the side of the pixel. Therefore, the material of the counter electrode 4A is selected from the group consisting of aluminum, chromium, a metal alloy including aluminum or chromium as a main component, and so on.

Embodiment 26

Figure 27:
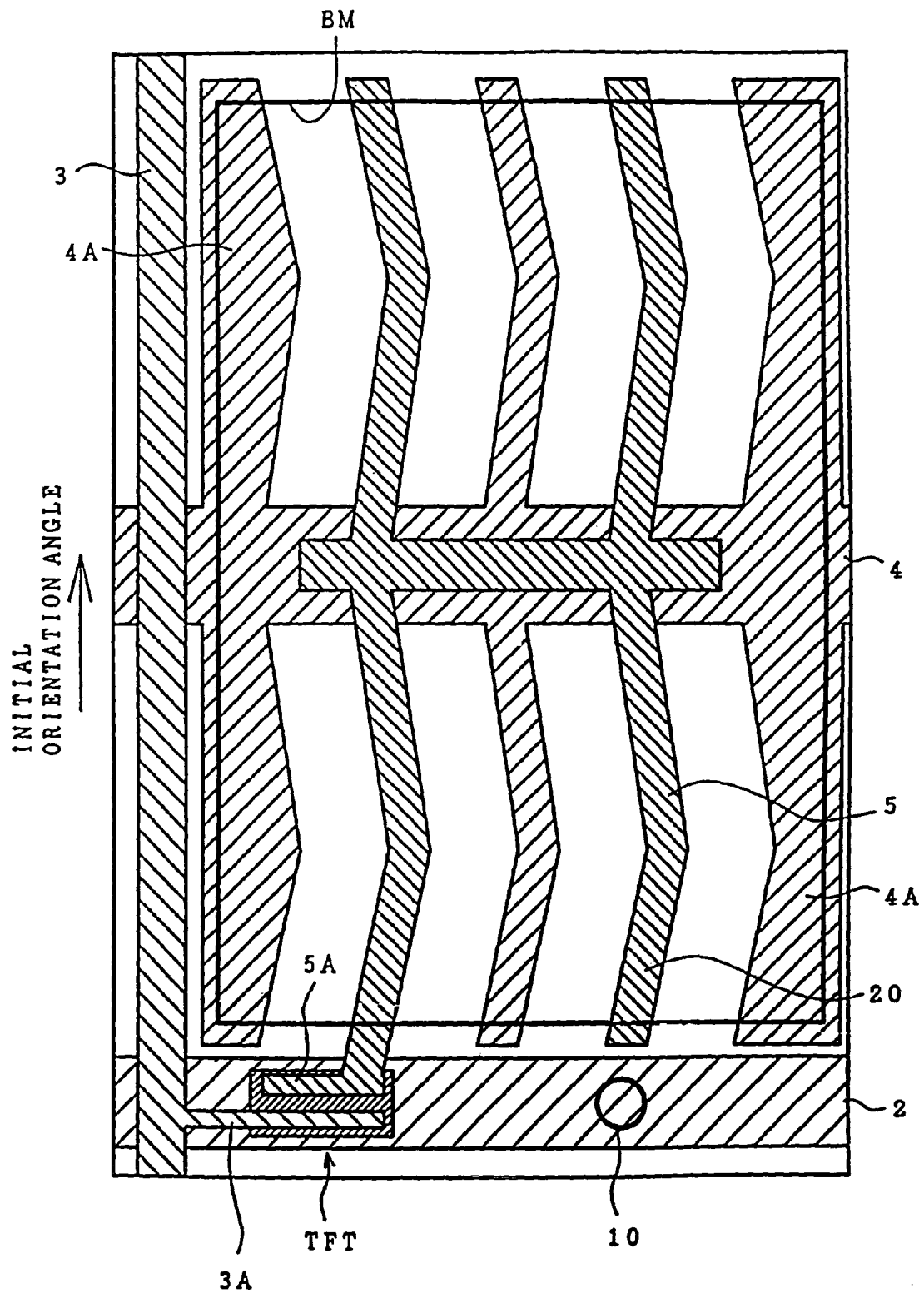
FIG. 27 is a plan view of the pixel of a liquid crystal display according to a twenty-sixth embodiment of the present invention.

FIG. 27 is a plan view of the pixel of a liquid crystal display according to a twenty-sixth embodiment of the present invention. In this embodiment, a portion 20 functions as a shield material to hide alignment defects which are caused by the rubbing in the initial orientation direction. Moreover, in this embodiment, the portion 20 combines the shield material and the pixel electrode 5. Therefore, the material of the pixel electrode 5 is selected from the group consisting of aluminum, chromium, a metal alloy including aluminum or chromium as a main component, and so on.

Embodiment 27

Figure 28:
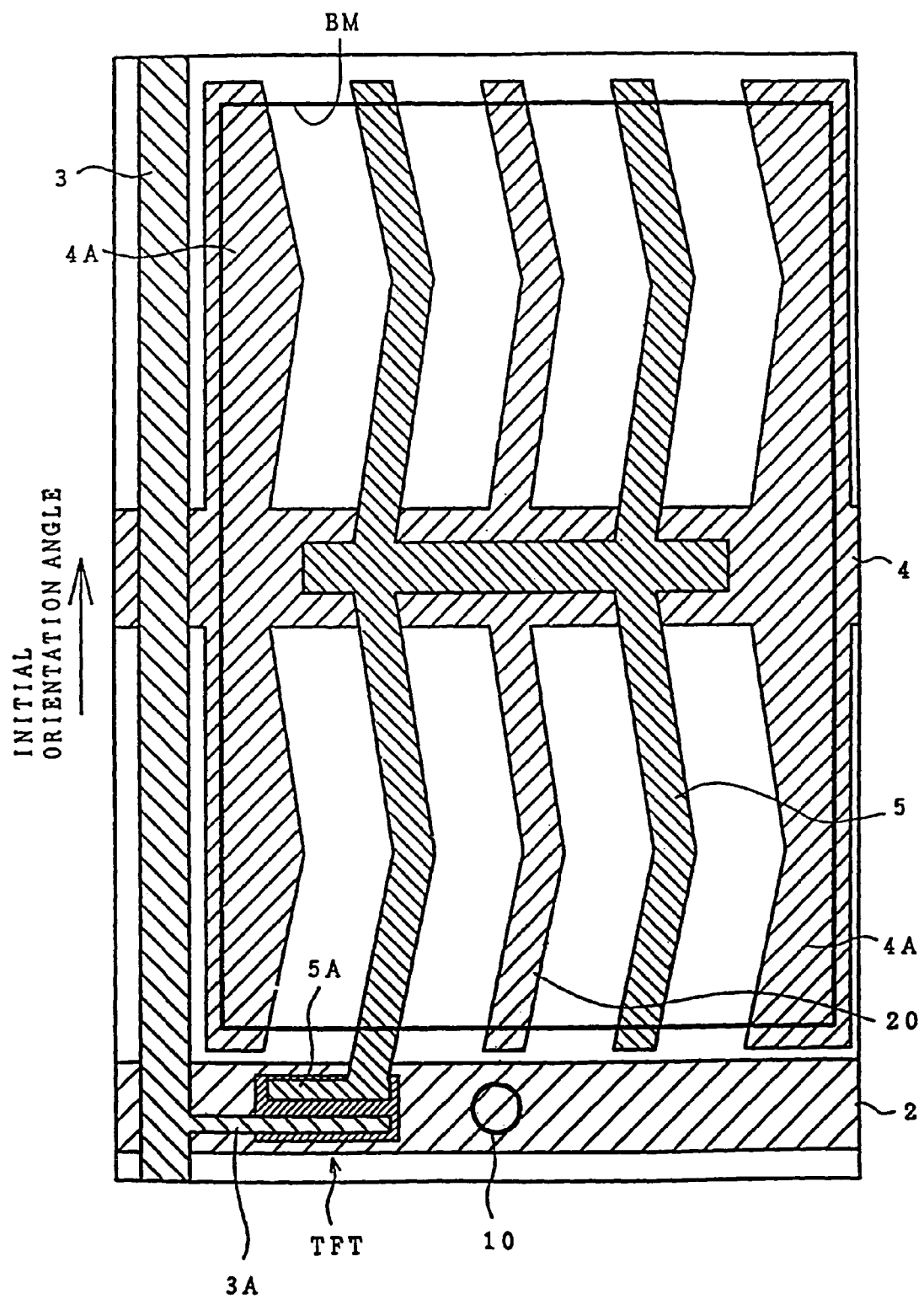
FIG. 28 is a plan view of the pixel of a liquid crystal display according to a twenty-seventh embodiment of the present invention.

FIG. 28 is a plan view of the pixel of a liquid crystal display according to a twenty-seventh embodiment of the present invention. In this embodiment, a portion 20 functions as a shield material to hide alignment defects which are caused by the rubbing in the initial orientation direction. Moreover, in this embodiment, the portion 20 combine the shield material and the counter electrode 4A which is arranged at the center of the pixel. Therefore, the material of the counter electrode 4A is selected from the group of aluminum, chromium, a metal alloy including aluminum or chromium as a main component, and so on.

Embodiment 28

Figure 29:
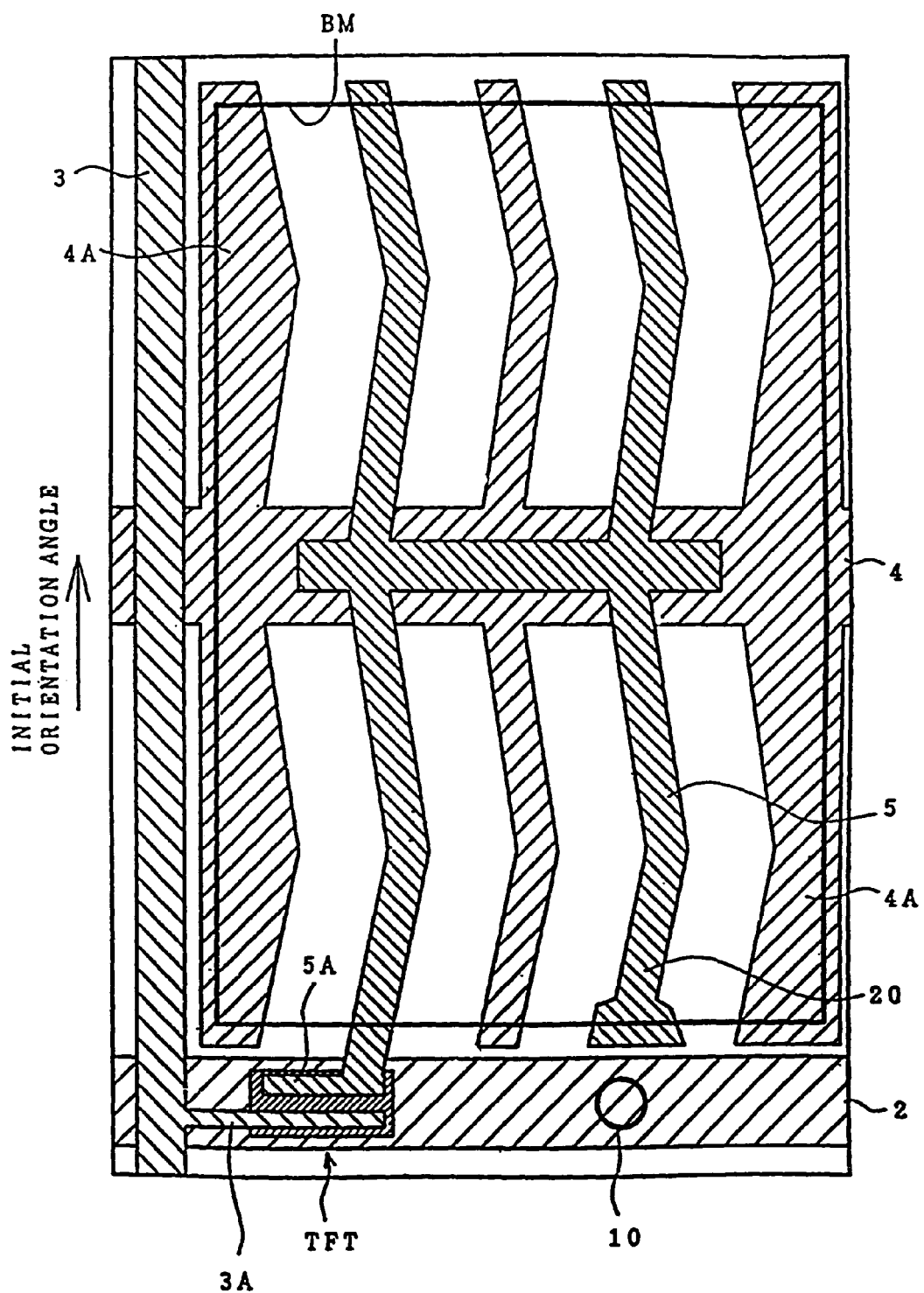
FIG. 29 is a plan view of the pixel of a liquid crystal display according to a twenty-eighth embodiment of the present invention.

FIG. 29 is a plan view of the pixel of a liquid crystal display according to a twenty-eighth embodiment of the present invention. In this embodiment, a portion 20 functions as a shield material to hide alignment defects which are caused by the rubbing in the initial orientation direction. Moreover, in this embodiment, the portion 20 combines the shield material and the pixel electrode 5. Therefore, the material of the pixel electrode 5 is selected from the group consisting of aluminum, chromium, a metal alloy including aluminum or chromium as a main component, and so on. Furthermore, the portion 20 of the pixel electrode 5 is wider than another portion for increasing shield area and improving the precision of the design of a TFT cell.

Embodiment 29

Figure 30:
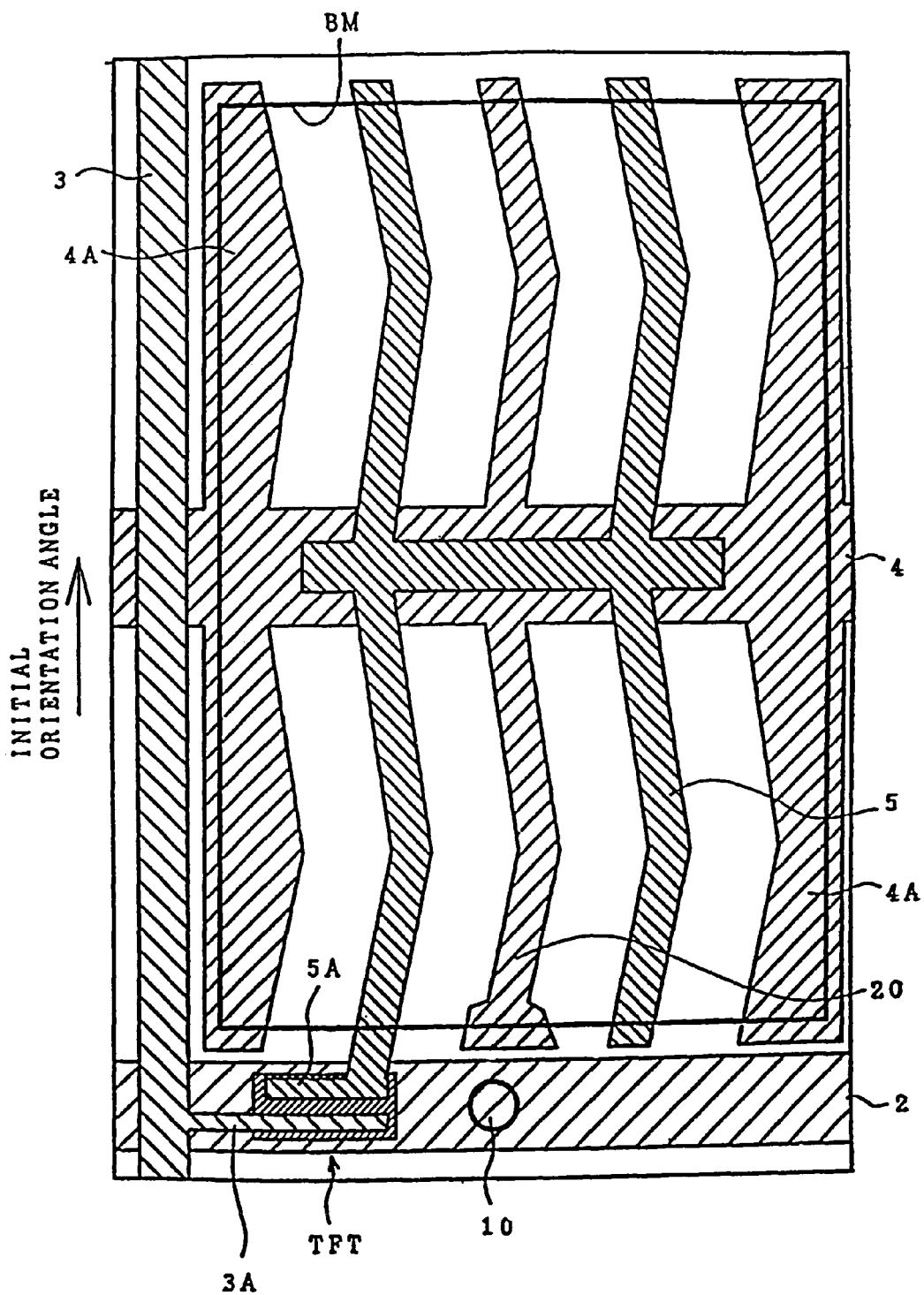
FIG. 30 is a plan view of the pixel of a liquid crystal display according to a twenty-ninth embodiment of the present invention.

FIG. 30 is a plan view of the pixel of a liquid crystal display according to a twenty-ninth embodiment of the present invention. In this embodiment, a portion 20 functions as a shield material to hide alignment defects which are caused by the rubbing in the initial orientation direction. Moreover, in this embodiment, the portion 20 combines the shield material and the counter electrode 4A which is arranged at the center or a pixel. Therefore, the material of the counter electrode 4A is selected from the group of consisting of aluminum, chromium, a metal alloy including aluminum or chromium as a main component, and so on. Furthermore, the portion 20 of the counter electrode 4A is wider than another portion for increasing shield area and improving the precision of the design of a TFT cell. In this way, this invention is to provide a multi-domain system IPS (In—Plane Switching mode) liquid crystal display which has high contrast and does not have an improper image display. Thus, this invention achieves both advantages of preventing advantages the inversion of luminance when the view point of the observer is at an angle with respect to the slanting direction of the liquid crystal display panel, and providing remarkably high contrast (350:1) and high aperture ratio for a color active matrix liquid crystal display.

What is claimed:

1. A liquid display device comprising:
   first and second substrates with a liquid crystal layer therebetween;
   a plurality of gate lines and a plurality of drain lines formed on the first substrate;
   a counter electrode and a pixel electrode formed on the first substrate and arranged in each of a plurality of pixels each defined by one of the gate lines and one of the drain lines;
   a black matrix formed on the second substrate;
   wherein the gate line and an edge of the black matrix are elongated parallel to an initial orientation direction defined by an initial orientation angle, the black matrix is at least formed over the gate line in plane view, and a spacer is arranged over a part of the gate line in plane view, and
   the pixel electrode has a plurality of comb-tooth-shaped portions at a non-zero angle to the horizontal direction with spaces formed therebetween, and an angle formed between an elongated direction of the plurality of comb-tooth-shaped portions and the initial orientation direction is smaller than an angle formed between the elongated direction of the plurality of comb-tooth-shaped portions and the drain line.

2. A liquid display device according to claim 1, wherein the initial orientation angle is identical for both the first substrate and the second substrate.

3. A liquid display device according to claim 1, wherein the pixel electrode has a first direction and a second direction in each of the pixels, and the first direction and the second direction form different polarities to the initial orientation direction.

4. A liquid display device according to claim 3, wherein the first direction and the second direction are symmetrical to the initial orientation direction.

5. A liquid display device according to claim 4, wherein the liquid crystal layer has positive dielectric anisotropy.

6. A liquid display device according to claim 5, wherein both a first direction part and a second direction part of the pixel electrode are connected by a bar part arranged perpendicular to the initial orientation direction.

7. A liquid display device according to claim 6, wherein a third direction part of pixel electrode is arranged between the first direction part and the second direction part.

8. A liquid display device according to claim 6, wherein the initial orientation angle is identical for both the first substrate and the second substrate.

* * * * *